(12) United States Patent
Curran

(10) Patent No.: US 8,777,017 B2
(45) Date of Patent: *Jul. 15, 2014

(54) APPARATUS AND METHOD FOR FILTER CLEANING BY ULTRASOUND, BACKWASHING AND FILTER MOVEMENT DURING THE FILTRATION OF BIOLOGICAL SAMPLES

(75) Inventor: Stephen Curran, York (GB)

(73) Assignee: Smith & Nephew, Inc., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,335

(22) Filed: Sep. 14, 2012

(65) Prior Publication Data

US 2013/0098827 A1 Apr. 25, 2013

Related U.S. Application Data

(63) Continuation of application No. 12/527,561, filed as application No. PCT/GB2008/000704 on Feb. 29, 2008, now Pat. No. 8,273,253.

(30) Foreign Application Priority Data

Mar. 2, 2007 (GB) .................................. 0704180.9
Nov. 15, 2007 (GB) .................................. 0722448.8
Feb. 1, 2008 (GB) .................................. 0801901.0

(51) Int. Cl.
*C02F 1/34* (2006.01)

(52) U.S. Cl.
CPC .............. *C02F 1/34* (2013.01); *C02F 2209/005* (2013.01)
USPC ..................................... 210/384; 210/748.05

(58) Field of Classification Search
CPC .................. C02F 1/34; C02F 2209/005; C02F 2209/006; C02F 2209/008
USPC ............. 210/748.02, 748.05, 384, 416.1, 473
See application file for complete search history.

(56) References Cited

U.S. PATENT DOCUMENTS 3,838,776 A 10/1974 Brun et al.
4,253,962 A * 3/1981 Thompson ..................... 210/414

(Continued)

FOREIGN PATENT DOCUMENTS

DE 19844310 3/2000
EP 0806475 11/1997

(Continued)

OTHER PUBLICATIONS

Apelman, "Separation of animal cells in continuous cell culture systems. In Animal Cell Technology: Basic and Applied Aspects," Kluwer Academic Publishers 149-54 (1992).

(Continued)

*Primary Examiner* — Fred Prince
(74) *Attorney, Agent, or Firm* — David L. Fox; JL Salazar Law Firm

(57) ABSTRACT

The present application is directed to the separation of a solid fraction from a fluid sample particularly a therapeutic cellular fraction from a biological sample such as a bone marrow sample by a porous filter which separates a filtration unit into an upper pre-filtration chamber into which a fluid sample requiring cell separation is introduced and a lower post-filtration chamber into which a fluid capable of transmitting an acoustic standing wave is introduced. An acoustic element is coupled to a substrate which is located within and at the bottom of the lower chamber and which resonates in response to the acoustic generating element and generates a standing wave through the two fluid phases and the filter to agitate the sample. Simultaneously, a cyclic process of vacuum draw, causes movement of the sample downwards through the filter. Vacuum pressure, fluid flow rate and frequency of vibration are controlled from a remote unit housing appropriate pumps and valves.

21 Claims, 12 Drawing Sheets

(56) References Cited

U.S. PATENT DOCUMENTS

| | | | |
|---|---|---|---|
| 4,301,013 A | 11/1981 | Setti et al. | |
| 5,085,783 A | 2/1992 | Feke et al. | |
| 5,225,089 A * | 7/1993 | Benes et al. | 210/748.05 |
| 5,472,605 A | 12/1995 | Zuk, Jr. | |
| 5,724,988 A | 3/1998 | Dennehey et al. | |
| 5,919,376 A | 7/1999 | Carman | |
| 5,948,441 A | 9/1999 | Lenk et al. | |
| 6,139,757 A | 10/2000 | Ohmura et al. | |
| 6,189,704 B1 | 2/2001 | Dennehey et al. | |
| 6,221,258 B1 | 4/2001 | Feke et al. | |
| 6,268,119 B1 | 7/2001 | Sumita et al. | |
| 6,406,622 B1 | 6/2002 | Tsuihiji et al. | |
| 6,428,709 B1 | 8/2002 | Tsuihiji et al. | |
| 6,461,524 B1 | 10/2002 | Tsuihiji et al. | |
| 6,523,698 B1 | 2/2003 | Dennehey et al. | |
| 6,543,455 B2 | 4/2003 | Bonutti | |
| 6,544,751 B1 | 4/2003 | Brandwein et al. | |
| 6,797,158 B2 | 9/2004 | Feke et al. | |
| 6,878,371 B2 | 4/2005 | Ueno et al. | |
| 6,949,355 B2 | 9/2005 | Yamanishi et al. | |
| 7,166,443 B2 | 1/2007 | Walker et al. | |
| 7,291,450 B2 | 11/2007 | Sowemimo-Coker et al. | |
| 7,316,932 B2 | 1/2008 | Woodside | |
| 7,364,657 B2 | 4/2008 | Mandrusov et al. | |
| 8,273,253 B2 * | 9/2012 | Curran | 210/748.02 |
| 2002/0039786 A1 | 4/2002 | Reid et al. | |
| 2002/0182186 A1 | 12/2002 | Loeb | |
| 2003/0134417 A1 | 7/2003 | Brandwein et al. | |
| 2003/0148512 A1 | 8/2003 | Fanslow, III et al. | |
| 2004/0152190 A1 | 8/2004 | Sumita | |
| 2005/0147597 A1 | 7/2005 | Ueno et al. | |
| 2005/0189297 A1 | 9/2005 | Bosch et al. | |
| 2005/0205498 A1 | 9/2005 | Sowemimo-Coker et al. | |
| 2006/0251628 A1 | 11/2006 | Attawia et al. | |
| 2007/0202536 A1 | 8/2007 | Yamanishi et al. | |
| 2007/0275459 A1 | 11/2007 | Terashima et al. | |
| 2008/0014181 A1 | 1/2008 | Ariff et al. | |
| 2008/0057505 A1 | 3/2008 | Lin et al. | |
| 2008/0075698 A1 | 3/2008 | Sawada et al. | |
| 2008/0081033 A1 | 4/2008 | Sowemimo-Coker et al. | |
| 2008/0081367 A1 | 4/2008 | Sowemimo-Coker et al. | |
| 2008/0108047 A1 | 5/2008 | Woodside | |
| 2008/0145345 A1 | 6/2008 | Mandrusov et al. | |
| 2008/0197048 A1 | 8/2008 | Crovace et al. | |
| 2008/0206757 A1 | 8/2008 | Lin et al. | |
| 2009/0053282 A1 | 2/2009 | Smiler et al. | |
| 2009/0060884 A1 | 3/2009 | Mazzocca et al. | |
| 2009/0208464 A1 | 8/2009 | Centeno | |
| 2009/0304644 A1 | 12/2009 | Hedrick et al. | |

FOREIGN PATENT DOCUMENTS

| | | |
|---|---|---|
| EP | 0987034 | 1/2000 |
| EP | 1055445 | 11/2000 |
| EP | 1055447 | 11/2000 |
| EP | 1055448 | 11/2000 |
| EP | 1227825 | 8/2002 |
| EP | 1252293 | 10/2002 |
| EP | 1303530 | 4/2003 |
| EP | 1439897 | 7/2004 |
| EP | 1465983 | 10/2004 |
| EP | 1484390 | 12/2004 |
| EP | 1683857 | 7/2006 |
| EP | 1689855 | 8/2006 |
| EP | 1690930 | 8/2006 |
| EP | 1694856 | 8/2006 |
| EP | 1719999 | 11/2006 |
| EP | 1728857 | 12/2006 |
| EP | 1765980 | 3/2007 |
| EP | 1811018 | 7/2007 |
| EP | 1907014 | 4/2008 |
| EP | 1978977 | 10/2008 |
| EP | 2041299 | 4/2009 |
| EP | 2043666 | 4/2009 |
| EP | 2139428 | 1/2010 |
| GB | 2235882 | 3/1991 |
| GB | 2392116 | 2/2004 |
| GB | 243393 | 3/2007 |
| JP | 51029772 | 3/1976 |
| JP | 57145662 | 9/1982 |
| JP | 3157108 | 7/1991 |
| JP | 8141325 | 6/1996 |
| JP | 8281020 | 10/1996 |
| JP | 9121849 | 5/1997 |
| JP | 9121850 | 5/1997 |
| JP | 9322758 | 12/1997 |
| JP | 10137557 | 5/1998 |
| JP | 11090123 | 4/1999 |
| JP | 11314014 | 11/1999 |
| JP | 2000083649 | 3/2000 |
| JP | 2001000178 | 1/2001 |
| JP | 2001347111 | 12/2001 |
| JP | 2003116521 | 4/2003 |
| JP | 2006102720 | 4/2006 |
| JP | 2006194908 | 7/2006 |
| WO | 8909646 | 10/1989 |
| WO | 9421361 | 9/1994 |
| WO | WO 94/21361 A * | 9/1994 |
| WO | 9501214 | 1/1995 |
| WO | 9845413 | 10/1998 |
| WO | 0134167 | 5/2001 |
| WO | 0153462 | 7/2001 |
| WO | 0208389 | 1/2002 |

OTHER PUBLICATIONS

Caplan, "Review: Mesenchymal stem cells: Cell Based Reconstructive Therapy in Orthopaedics," Tissue Engineering, 11(7/8)1198-1211 (2005).

Castilho, "Cell retention devices for suspended cell-perfusion cultures," Advances in Biochemical Engineering/Biotechnology, 74:129-169 (2002).

Coakley, et al., "Ultrasonic manipulation of particles and cells," Bioseparation, 4: 73-83 (1994).

Doblhoff-Dier, et al., "A novel ultrasonic resonance field device for the retention of animal cells," Biotechnol. Prog., 10:428-432 (1994).

Docoslis, et al., "A novel dielectrophoresis-based device for the selective retention of viable cells in culture media," Biotechnology and Bioengineering, 54(3):239-50 (1997).

Docoslis, et al., Dielectrophoretic forces can be safely used to retain viable cells in perfusion cultures of animal cells, Cytotechnology, 30:133-42 (1999).

Examiner's First Report dated Oct. 10, 2011 in related Australian Patent Application No. 2008223632.

First Office Action dated Mar. 16, 2011 in related Chinese Patent Application No. 200880006915.6.

Gaida, et al., "Selective retention of viable cells in ultrasonic resonance field devices," Biotechnol. Prog., 12: 73-76 (1996).

Gorenflo, et al., "Optimization of an acoustic cell filter with a novel air backflush system," Biotechnol. Prog., 19:30-6 (2003).

Gorenflo, et al., "Scale-up and optimisation of an acoustic filter for 200 L/day perfusion of CHO cell culture," Biotechnology and Bioengineering, 80(4):438-44 (2002).

Himmerlfarb, et al., "Spin filter culture: the propagation of mammalian cells in suspension," Science 164:555-5577 (1969).

Jaeger, "High density perfusion culture of animal cells using a novel continuous flow centrifuge," In Animal Cell Technology: Basic and Applied Aspects, 209-348 (1992).

Karumanchi, et al., Field assisted extraction of cells, particles and macromolecules, Trends in Biotechnology, 20(2): 72-78 (2002).

Kilburn, et al.,"Enhanced sedimentation of mammalian cells following acoustic aggregation," Biotechnology and Bioengineering, 34: 559-62 (1989).

Kilburn, et al., "Enhanced sedimentation of mammalian cells following acoustic aggregation," Biotechnology and Bioengineering, 34: 559-62 (1989).

Letter dated Dec. 6, 2011 with English translation of Official Letter issued in corresponding Russuan Patent Application No. 2009136060.

(56) References Cited

OTHER PUBLICATIONS

Letter dated Jun. 6, 2012 reporting Office Action issued in Russian Application No. 2009136060.
Maiorella, et al.,"Crossflow micro filtration of animal cells," Biotechnology and Bioengineering, 37:121-6 (1991).
Office Action dated Jun. 7, 2012 in Chinese Patent Application No. 200880006915.6.
Office Action dated May 14, 2012 in Japanese Patent Application No. 2009-551270.
Radlett, "The concentration of mammalian cells in a tangential flow filtration unit," J Appl. Chem Biotechnol., 22: 495-499 (1972).
Roath, et al., "High gradient magnetic separation in blood and bone marrow processing," Journal of Magnetism and Magnetic Materials, 85(1-3): 285-290 (1990).
Search Report, A1S Bone Device, 8 pages, dated Aug. 4, 2010.
Search Report, A1S Bone Device-update, 2 pages, dated Aug. 4, 2010.
Search Report, A1S Bone Device—update, 2 pages, dated Aug. 4, 2010.
Search Report, A1S Bone, 10 pages, dated Feb. 5, 2010.
Second College Edition, The American Heritage Dictionary, pp. 1313 (4 pages) (1985).
Stromberg, et al., "Membrane technology applied to donor plasmaphoresis," Journal of Membrane Science, 44 (1):131-143 (1989).
Takazawa, et al., "Production of human-mouse chimeric antibody by high cell density perfusion culture," Cytotechnology, 2:95-101 (1989).
Vogel, et al., "Controlled Shear Filtration: A Novel Technique for Animal Cell Separation," Biotechnology and Bioengineering, 63(6):663-674 (1999).
Office Action for Canadian Patent Application No. 2,679,042 dated Mar. 3, 2014, 3 pages.

\* cited by examiner

APPARATUS AND METHOD FOR FILTER CLEANING BY ULTRASOUND, BACKWASHING AND FILTER MOVEMENT DURING THE FILTRATION OF BIOLOGICAL SAMPLES

RELATED APPLICATIONS

This application is a continuation of U.S. Ser. No. 12/527,561 filed on Jan. 25, 2010, now U.S. Pat. No. 8,273,253, issued Sep. 25, 2012, which is the U.S. national phase of International Application No. PCT/GB2008/000704 filed on 29 Feb. 2008 published in English on 12 Dec. 2008 as International Publication No. WO 2008/107652 A1, which application claims the priority to UK provisional application No. 0704180.9 filed on 2 Mar. 2007, UK provisional application No. 0722448.8 filed on 15 Nov. 2007 and UK provisional application 0801901.0 filed on 1 Feb. 2008, all of which are herein incorporated in their entirety.

FIELD OF THE INVENTION

The present invention concerns the separation of a solid fraction from a fluid sample. In particular the invention relates to apparatus and methods for the separation of a therapeutic cellular fraction from a biological sample, such as a bone marrow sample.

BACKGROUND OF THE INVENTION

Progenitor cells have multi-lineage potential when differentiated and therefore potentially lend themselves to a diverse range of therapeutic treatments. It is conceived that an enriched fraction of these cells delivered to a diseased or damaged tissue site may have maximum therapeutic benefit through accelerated tissue healing. Progenitor cells are typically a very rare population of cells (Caplan 2005) contained within a heterogeneous mixture of non-therapeutic cells in some mammalian tissues and fluids.

Various techniques and devices to capture cells have been reported in the literature including sedimentation (Takazawa & Tokashiki, 1989), centrifugation (Apelman et al, 1992; Jaeger, 1992) spin filters (Himmerlflab et al 1969) and cross-flow microfiltration (Maiorella et al 1991). However, these are associated with a number of disadvantages. Sedimentation processes suffer from low sedimentation velocity of cells and a slow separation process. Centrifugation devices rely on a radial force to drive cells outwards from the fluid and although high recovery is quickly achieved these devices typically have a high capital cost associated with them. In addition, high shear stresses could potentially damage cells or induce unwanted changes in e.g. progenitor cells. Spin filters and cross-flow filters use membranes to filter the cell suspension and these are susceptible to fouling with subsequent loss in performance. Other processes using such filters include controlled shear filtration (Vogel and Kroner, 1999), tangential flow filtration (Radlett, 1972) and dynamic filtration. The rate and efficiency of separation is dependent on the degree of fouling. Dynamic filtration relies on relative motion between the membrane and the housing to generate a shear flow independent of flow across the filter (Castilho & Medrohno, 2002). Vortex flow filters and rotating disc filters are the two common types of dynamic filtration devices (Stromberg et al, 1989). Karumanchi et. al. (2002) have provided a review of field-assisted separation techniques for cells and biomacromolecules which include electric, magnetic and acoustic phenomena to achieve the desired separation. Dielectrophoresis is the lateral motion of uncharged particles due to the polarization effect produced by non-uniform electric fields (Docoslis et al, 1997, 1999). This is applicable only to very low electrical conductivity media otherwise excessive heating of the fluid will occur. Magnetic separations fall into two types. In the first, the cells to be separated have an intrinsic magnetic property (eg. red blood cells, magnetotactic bacteria) and in the second type the non-magnetic component of the mixture that are required must be rendered magnetic by a magnetic-responsive entity. In both cases the fluid must be subjected to a magnetic field to achieve separation. Magnetic separation has been used extensively for numerous cell separations including bone marrow processing to enrich for progenitor cells (Roath et al, 1990). Acoustic separators have been widely used to separate micro-organisms and cells but almost universally rely on using ultrasonic waves. Ultrasonic cell retention is achieved due to the formation of standing waves when an ultrasonic wave is reflected in the direction opposite to the propagation of the wave. Cells become trapped in the pressure node planes of the standing wave. Kilburn et al, (1989) and WO95/001214, first reported the possibility of using these waves as a means to separate cells from suspension and many other reports using this technique have been reported since (Coakley et al, 1994; Dobelhoof-Dier, 1994; Gaida et al, 1996; Gorenflo et al, 2003, 2004). Ultrasonic separators require careful tuning and typically have a limited loading capacity whereby only a small volume of cells is recovered. In addition this technique is used to remove a homogeneous population of cells from the fluid phase and therefore cannot capture a specific population from a heterogeneous mixture.

The present invention is directed towards apparatus and methods for separating a solid fraction from a fluid sample. In particular the present invention is directed to the separation of a cell fraction from a heterogeneous mixture of cells within a fluid sample. The process is a single step process with the cell separation being based upon the mechanical filtration of a sample using only physical means.

BRIEF SUMMARY OF THE INVENTION

According to an aspect of the invention there is provided apparatus for separating a solid fraction from a fluid sample, the apparatus comprising a filtration unit, the filtration unit comprising;

an acoustic wave generating element;

at least one filter which divides the unit into a pre-filtration chamber for receiving the fluid sample and a post-filtration chamber for receiving a fluid capable of transmitting acoustic waves; and a substrate configured to be associated with post-filtration chamber, the substrate being capable of resonation upon application of an acoustic wave thereto;

wherein the acoustic wave generating element is configured to be associated with the substrate such that the acoustic wave generating element causes resonation of the substrate which in turn transmits an acoustic standing wave through both the fluid within the post-filtration chamber and the fluid sample within the pre-filtration chamber.

The transmission of an acoustic standing wave through the fluids within the filtration unit results in the agitation of the fluids, either continuously or in a pulsed manner, during the separation process. A particular advantage of this agitation is that it minimizes the fouling and clogging of the filter.

In embodiments of the invention in which the apparatus is being utilised to separate a cellular fraction from a fluid sample, the agitation of the fluids in the unit has a further advantage in that it minimizes the contact time or residence time of the cells within the pre-filtration chamber with the filter. This is desirable because if the cells are in contact with or sufficiently adjacent to the surface of the filter there is tendency for the cells to be forced through pores under the pressure of the surrounding fluid. Such passage through the pore is achievable by the deformation of the cell, but during the passage the cells may be exposed to undesirable stresses, such as shear stress, which may have deleterious effects on the cell. In particular it has been shown that white cell function can be significantly affected by shear stresses (Carter et al, 2003). It is therefore desirable to prevent the cells of interest from passing through the filter. In this regard the filter is designed to allow the passage of fluid and other cellular fractions while retaining the cells of interest in the pre-filtration chamber.

An acoustic wave generating element is defined as a structure that can generate an acoustic wave field in response to a power signal. For example, in the case of a simple speaker, the power signal will physically deflect a diaphragm at a defined amplitude and frequency to generate the acoustic wave. Other acoustic elements include piezoelectric transducers that generate vibrational energy in response to applied AC voltages and the physical vibration is transferred to the fluid as an acoustic force. Examples of piezoelectric elements are ceramic discs with metal film electrodes on each side, these thin piezoelectric films are typically zinc-oxide.

The association of an acoustic wave generating element with a substrate capable of resonation has a number of advantages over the use of an acoustic element alone. The acoustic element is not in direct contact with the fluid as this element is designed to provide improved resonance when attached to a substrate material which has a much larger area than the cone of the element itself. This means more energy can be delivered to the fluid while still using a small acoustic element. Overall this significantly improves energy efficiency and footprint of the device, which is particularly advantageous when processing large fluid volumes. A suitable acoustic element can be obtained from NXT Technology Limited (Hong Kong), Model No. RM-ETN0033K19C-2K01.

In embodiments of the invention the acoustic wave generating element generates an acoustic standing wave having a frequency in the range of between about 300-700 Hz. A relationship exists between the fluid volume and the optimal frequency required. Therefore, advantageously in particular embodiments of the invention the user can input the volume of the fluid sample and the frequency of the acoustic standing wave will be calculated. For example, for a sample having a volume of between about 5 ml to 15 ml, the optimal frequency of the acoustic standing wave is between about 300 Hz to 700 Hz.

In a specific embodiment of the invention the acoustic wave generating element is a speaker having a power of 0.4 W, resistance of 4 Ohm, amplitude in the range of between about 4.2V to 7.36V peak to peak and a frequency range in the range of between about 300-700 Hz.

In embodiments of the invention the substrate is located substantially parallel to the filter.

In embodiments of the invention the substrate is located at the base of the filtration unit.

The substrate can be made of any suitable material which is capable of resonation in response to stimulation by the acoustic generating element. For example, a metal, a ceramic or a polymer. Advantageously, because the substrate may come into contact with the fluid used in the apparatus the substrate is made of medical grade material. This reduces the risk of any toxic substance contamination.

In embodiments of the invention the acoustic wave generating element is reversibly coupled to the substrate. This coupling can be achieved by a variety of means available to the man skilled in the art, for example the use of an adhesive. This is particularly advantageous if the filtration unit is designed to be disposable, because the acoustic element can be uncoupled and re-used on other units.

The movement of the fluid sample across the filter can be via passive movement resulting from gravitational forces. Alternatively the fluid sample can be actively moved across the filter by the application of a positive or a negative pressure. The flow rate of the fluid sample across the filter can be constant or variable.

In embodiments of the invention the fluid provided within the post-filtration chamber which is capable of transmitting an acoustic wave also acts as a washing fluid. In this embodiment, a positive pressure pump is provided which pushes the washing fluid from the post-filtration chamber through the filter to the pre-filtration chamber. At the same time a negative pressure pump is drawing fluid from the pre-filtration chamber to the post-filtration chamber. Thus, the fluid sample and the washing fluid are sequentially moved in opposing directions across the filter such that the net movement of the fluid sample is into the post-filtration chamber and the separated solid fraction is retained in the pre-filtration chamber.

The sequential movement of the fluid sample and the washing fluid in opposing directions across the filter prevents fouling and clogging of the filter, further increasing the efficiency of the separation process. This sequential movement can be cyclical, with one phase of the cycle being the rapid back-flushing of the filter using the washing fluid and the second phase of the cycle being the forcing of fluid sample downwards through the filter. This cyclic process is continued in order to sufficiently reduce the sample volume while also retaining a sufficient volume of fluid above the filter such that the particulate fraction is retained in solution. Typically the sample volume is reduced by about 10-fold.

In further embodiments of the invention the filter itself is agitated during the separation process. This agitation can be achieved, for instance, by associating the filter with a moveable holder. Agitation can be in a vertical direction or a lateral direction or a combination thereof. In alternative embodiments of the invention the filter can be rotated.

Other means of additionally agitating the washing fluid and/or the fluid sample include using a rotating element (eg. impeller or insert in the fluid), rotating the walls of the chamber, or rotating the walls of the chamber, wherein the walls of the chamber are provided with baffles or the use of an active chip.

A "fluid sample" is any fluid from which solid components are to be separated. A sample can be from any source, such as an organism, group of organisms from the same or different species, from the environment such as from a body or water or from the soil, or from a food source, or an industrial source. A sample can be a processed or unprocessed sample. A sample can be a gas or a liquid. A sample can be an extract, for example a liquid extract of a soil or food sample.

The apparatus is particularly suitable for liquids that are viscous and which have a higher tendency to foul the filter by forming a film or coat on the surface of the filter. Back-washing of washing fluid through the filter, and optionally the agitation of the fluid sample and/or the filter significantly reduces the fouling of the filter and also maintains the particulate fraction in solution in the pre-filtration sub-chamber.

The sample can be obtained from a subject. The subject can be any organism, such as an animal or a human. An animal can include any animal, such as a feral animal or domestic animal. A domestic animal can include for example a companion animal such as a dog or cat.

The sample can be a biological sample such as a blood sample, an effusion, a urine sample, semen, bone marrow aspirate, spinal fluid, a cell suspension from tissue, mucus, sputum or saliva. The biological sample can be obtained from any animal and is not limited to a biological sample from humans.

A "blood sample" as used herein refers to a processed or unprocessed blood sample, including cord blood samples, bone marrow aspirates, internal blood or peripheral blood and can be of any volume and can be from any subject such as an animal or human. A preferred subject is human.

The solid fraction to be separated from the biological fluid sample can comprise at least one cell fraction. The cell fraction preferably comprises a therapeutic cell, that is any cell that can have therapeutic or curative effects.

The cell fraction can comprise or consist of at least one white blood cell. A "white blood cell" is a leukocyte or a cell of hematopoietic lineage that is not a reticulocyte or platelet and which can be found in the blood of an animal or human. Leukocytes can include natural killer cells ("NK cells"), and lymphocytes such as B lymphocytes ("B cells") or T lymphocytes ("T cells"). Leukocytes can also include phagocytic cells such as monocytes, macrophages, and granulocytes, including basophils, eosinophils and neutrophils. Leukocytes can also include mast cells.

The cell fraction can comprise or consist of at least one red blood cell. A "red blood cell" is an erythrocyte.

The cell fraction can comprise or consist of at least one neoplastic cell. A "neoplastic cell" refers to abnormal cells that have uncontrolled cellular proliferation and continue to grow after the stimuli that induced the new growth has been withdrawn. Neoplastic cells tend to show partial or complete lack of structural organization and functional coordination with the normal tissue, and may be benign or malignant.

The cell fraction can comprise or consist of at least one malignant cell. A "malignant cell" refers to a cell having the property locally invasive and destructive growth and metastasis. Examples of malignant cells include, but are not limited to; leukemia cells, lymphoma cells, cancers cells of solid tumors, metastatic solid tumor cells (e.g. breast cancer cells, prostate cancer cells, lung cancer cells, colon cancer cells) in various body fluids including blood, bone marrow, ascistic fluids, urine, bronchial washes.

The cell fraction can comprise or consist of at least one cancerous cell. A "cancerous cell" refers to a cell that exhibits deregulated growth and, in most cases, has lost at least one of its differentiated properties, such as, but not limited to, characteristic morphology, non-migratory behavior, cell-cell interaction, and cell-signaling behavior, protein expression and secretion pattern etc.

The cell fraction can comprise or consist of at least one stem cell. A "stem cell" is an undifferentiated cell that can give rise, through one or more cell division cycles, to at least one differentiated cell type.

The cell fraction can comprise or consist of at least one progenitor cell. A "progenitor cell" is a committed but undifferentiated cell that can give rise, through one or more cell division cycles, to at least one differentiated cell type. Typically a stem cell gives rise to a progenitor cell through one or more cell divisions in response to a particular stimulus or set of stimuli and a progenitor gives rise to one or more differentiated cell types in response to a particular stimulus or set of stimuli.

Bone marrow (or medulla ossea) is the soft tissue found in the hollow interior of bones. There are two types of bone marrow: red marrow (also known as myeloid tissue) and yellow marrow. Red blood cells, platelets and most white blood cells arise in red marrow; some white blood cells develop in yellow marrow.

Bone marrow contains two types of stem cells: hematopoietic stem cells and mesenchymal stem cells. Stem cells are primal cells common to all multi-cellular organisms that retain the ability to renew themselves through cell division and can differentiate into a wide range of specialized cell types. Hematopoietic stem cells give rise to the three classes of blood cell that are found in the circulation: white blood cells (leukocytes), red blood cells (erythrocytes), and platelets (thrombocytes). Mesenchymal stem cells are found arrayed around the central sinus in the bone marrow and have the capability to differentiate into osteoblasts, chondrocytes, myocytes, and many other types of cell.

While embryonic stem cells are true stem cells in that they are totipotent or pluripotent and show unlimited capacity for self-renewal, the adult stem cells within the bone marrow are more appropriately termed progenitor cells, which like stem cells have a capacity for self-renewal and differentiation, although far more limited. Progenitor cells are usually unipotent or multipotent rather than pluripotent.

Mesenchymal stem cells or MSCs, classically obtained from bone marrow are multipotent stem cells that can differentiate into a variety of cell types. Cell types that MSCs have been shown to differentiate into include osteoblasts, chondrocytes, myocytes, adipocytes, neuronal cells.

Bone marrow density can and does vary from patient to patient and there is no uniform viscosity to bone marrow. Younger patients often have a denser thicker marrow the result of more trabecular tissue in the cavity. This viscous marrow has a tendency to foul the filters within separation devices.

In embodiments of the invention the fluid sample is a bone marrow aspirate.

In further embodiments of the invention the fluid sample is a bone marrow aspirate and the solid fraction is a progenitor cell.

A "tissue" as used herein includes the four basic types of tissue present in all animals: epithelium, connective tissue, muscle tissue and nerve tissue.

Examples of connective tissue include skin, muscle, cartilage, bone, tendon, ligament, joint capsule and adipose tissue.

"Adipose tissue" as used herein is intended to mean fat and other sources of microvascular tissue in the body. Adipose tissue is a complex tissue containing multiple cell types including adipocytes, pericytes, fibroblasts, macrophages, stem cells and microvascular cells. As such adipose tissue is one of the most convenient sources of precursor cells in the body.

"Microvascular cells" as used herein is intended to mean cells which comprise the structure of the microvasculature, such as endothelial cells, smooth muscle cells and pericytes.

Adipose tissue can be harvested from an "adipose" depot within the body. Suitable depots include the epididymis, the interscapular fat pad or the infrapatellar fat pad (Hoffas fat pad). Alternatively, and potentially more conveniently, the adipose tissue can be a lipoaspirate resulting from a liposuction procedure.

While a lipoaspirate can be directly introduced into the device of the present invention, fragments of adipose tissue require pre-processing. The tissue fragments are comminuted and/or enzymatically digested to release the cellular component of the tissue. This cellular component can then be suspended in a suitable carrier and introduced into the device.

It is envisaged that the lipoaspirate and/or cell suspension obtained above can undergo further processing prior to introduction into the device. For example, gravitational sedimentation and/or centrifugation can be used to separate large fat globules and adipocytes from the stromal fraction (comprising stem cells, endothelial cells and pericytes).

In embodiments of the invention in which a biological sample is being filtered the filtration unit can be coupled to an aspirator such that the fluid is transferred directly from the subject into the filtration unit. The filtration unit can be used in a sterile environment and this arrangement reduces the risk of contamination of the sample between removal of the sample from the patient and introduction into the filtration unit.

In alternative embodiments of the invention the solid fraction can consist of an etiological agent such as bacteria, fungus, protozoan, virus, parasite or prion that can infect a subject.

The sample can be an in vitro cell suspension.

The filter, which can also be referred to as a foil, can be manufactured of any material suitable for separating a solid fraction from a fluid sample in the method described in the present invention. The filter can be manufactured from a natural or a synthetic material or a combination thereof. Suitable materials, include, but are not limited to metals, metal alloys, ceramics or polymeric materials. Examples include polycarbonate (PLC), polyethylene terephthalate (PET), polyidide (PI), nickel and stainless steel. The materials are preferably medical grade materials. Suitable tracked etched filters are available from it4ip (Belgium). Suitable nickel foil filters are available from Tecan Limited (U.K.).

In embodiments of the invention the filter is substantially planar. That is to say, the filter has a 2-dimensional profile wherein the diameter of the filter is greater than the height of the filter. Such a profile increases the potential surface area by which the filter is exposed to the fluid sample, thereby increasing the rate of filtration. The profile also minimizes the potential for any solid matter to become clogged within the filter.

Examples of suitable thickness for the filter are 11, 23 and 50 microns. The thinner the filter the faster the rate of flow of fluid therethrough.

It is envisaged that filter can be provided with pores of the same diameter or varying diameter having the same geometry. Alternatively, the filter can be provided with pores of the same diameter with varying geometry. Alternatively still the filter can be provided with pores of varying diameter and varying geometry Suitable pore geometries include, but are not limited to, circular, ellipsoidal, square, rectangular or triangular in lateral cross-section.

The pores can be tapered. Tapering of the pores facilitates deformation of the cells under vacuum. Depending on the size of the pore at each end of the taper and the orientation of the taper, preferential selection of cells based on size can be achieved. In advantageous embodiments of the invention the narrowest point of the tapered pore is located at the upper surface of the filter. This arrangement allows smaller cells to flow through the pore whilst larger cells are retained above the filter. Conversely, it seems to make it more difficult during the backwash of washing fluid upwards through the filter for the cells in the post-filtration chamber to return through pores. It has been found that if the narrowest point of the pore is located at the lower surface of the filter cells have a tendency to enter the pore and deform in order to squeeze through the narrowest point.

In particular embodiments of the invention the pores have a diameter range of between about 1 micron and 12 micron.

In further embodiments of the invention the pores can be cylindrical in shape.

In further embodiments of the invention in which progenitor cells are separated from a bone marrow aspirate, a suitable filter is made of PET, has, a thickness of 23 microns, a pore diameter of 3 microns and a pore density of 400,000 pores per $cm^2$. The optimal negative pressure generated by a vacuum pump to effectively "pull" the fluid through the filter is in the range of about −0.1 to −0.5 psi, more specifically −0.2 to −0.3 psi. Alternatively a positive pressure can be generated to effectively "push" the fluid through the filter. The optimal positive pressure generated by such a pump is in the range of about +0.1 to +0.5 psi, more specifically +0.2 to +0.3 psi.

The design of the filtration unit can be modified such that the aspect ratio of the pre-filtration chamber for the fluid sample is reduced thereby providing a larger surface area for filtration per unit volume.

In further embodiments of the invention, the pre-filtration chamber of the filtration unit is divided into multiple chambers that can be used to receive batch fluid samples presented as a well plate format.

Following filtration the remaining fluid sample, which comprises the separated (also referred to as a purified, enriched or concentrated) solid fraction, can be removed from the upper chamber of the filtration unit by suction, for example using a pipette and either stored or utilized. In other embodiments of the invention, particularly in embodiments in which the remaining fluid sample comprises a therapeutic cell fraction, the remaining fluid sample can be mixed with, for example, a hydrogel or a bone cement. In these embodiments the hydrogel or bone cement functions as a cell repository.

According to an aspect of the invention there is provided a method of separating a solid fraction from a fluid sample, said method comprising the steps of;

i) introducing a fluid sample into the apparatus of the present invention;

ii) filtering the fluid sample; and iii) removing the separated fraction from the pre-filtration chamber.

According to a further aspect of the invention there is provided a method of isolating or separating a therapeutic cell from a fluid sample using apparatus of the present invention.

In embodiments of the invention the fluid, sample can be a biological sample such as a blood sample, an effusion, a urine sample, semen, bone marrow aspirate, spinal fluid, a cell suspension from tissue, mucus, sputum or saliva.

In embodiments of the invention the therapeutic cell is a progenitor cell.

According to a further aspect of the invention there is provided a method of isolating or separating a therapeutic cell from a bone marrow aspirate using apparatus of the present invention.

In embodiments of the invention the therapeutic cell is a progenitor cell.

The system can be operated manually. However, in order to improve the overall efficiency and accuracy of the separation process, particularly when the apparatus is used in an operating room situation by medical staff, the apparatus is advantageously automated. A Programmable Logic Controller (PLC) can be programmed to switch a vacuum pump and a backwashing pump on and off in cyclic rotation in a timed sequence. The vacuum pump draws the fluid sample downwards through the filter under negative pressure. The backwashing pump forces washing fluid upwards through the filter.

The filtration chamber and/or the filter can be disposable. The control unit can be disposable or a standalone dedicated unit.

In a further aspect of the invention the isolated therapeutic cell(s) can be directly administered as a suspension into a site in need thereof. Alternatively, the cells can be combined with or associated with an appropriate carrier material, for example, a gel, a paste, a cement, a glue, a scaffold, a film, an implant or a dressing.

It is envisaged that the isolated therapeutic cells can be utilized in a range of medical applications, for humans and/or non-human animals to repair, regenerate and/or augment tissue function.

Examples of medical applications include orthopaedic, neurological, cardiovascular, dermatology, cosmetic surgery and dental.

It is envisaged that in certain embodiments of the invention the isolated therapeutic cells comprise mesenchymal stem cells. These cells are capable of differentiation into osteoblasts, chondrocytes, myocytes and adipocytes. A therapeutic fraction comprising mesenchymal stem cells can be used in orthopaedic indications, resulting from disease or injury, such as cartilage repair, bone repair (including fracture repair), spinal fusion, degenerative disc treatment (including annulus repair, nucleous populous augmentation, disc augmentation).

Functional endothelial progenitor cells (EPCs) are central to vasculogenesis and angiogenesis. EPCs have been shown to develop from bone marrow mononuclear cells in adult animals. It is therefore envisaged that in certain embodiments of the invention the isolated therapeutic cells comprise EPCs and this therapeutic fraction can be used in indications in which damaged or ischemic tissue requires repair, regeneration or vasculogenesis, such as peripheral vascular disease.

There is therefore provided methods for i) forming new blood vessels in a tissue in a subject, ii) increasing blood flow in a tissue in a subject, iii) treating diseased tissue in a subject, iv) increasing angiogenesis in a diseased tissue or v) preventing heart failure in a subject, all of said methods comprising the steps of;
  a) isolating bone marrow mononuclear cells using the apparatus according to the present invention,
  b) transplanting locally into the tissue an effective amount of the bone marrow mononuclear cells so as to form new blood vessels in the tissue.

In embodiments of the invention the bone marrow mononuclear cells are autologous.

The tissue into which the bone marrow mononuclear cells are transplanted includes and diseased or damaged tissue and any tissue in need of repair or regeneration, including but not limited to underpurfused tissue such as tissue found in chronic ischemia, and also cardiac muscle tissue, skeletal muscle tissue, brain tissue e.g affected by stroke or AV malformations, coronary vessels, kidney, liver, organs of the gastrointestinal tract, muscle tissue afflicted by atrophy, including neurologically based muscle atrophy.

In embodiments of the invention the new blood vessels are capillaries and/or collateral blood vessels.

BRIEF DESCRIPTION OF THE DRAWINGS

The invention will be described below with reference to the accompanying drawings, in which.

DETAILED DESCRIPTION OF THE INVENTION

Figure 1:
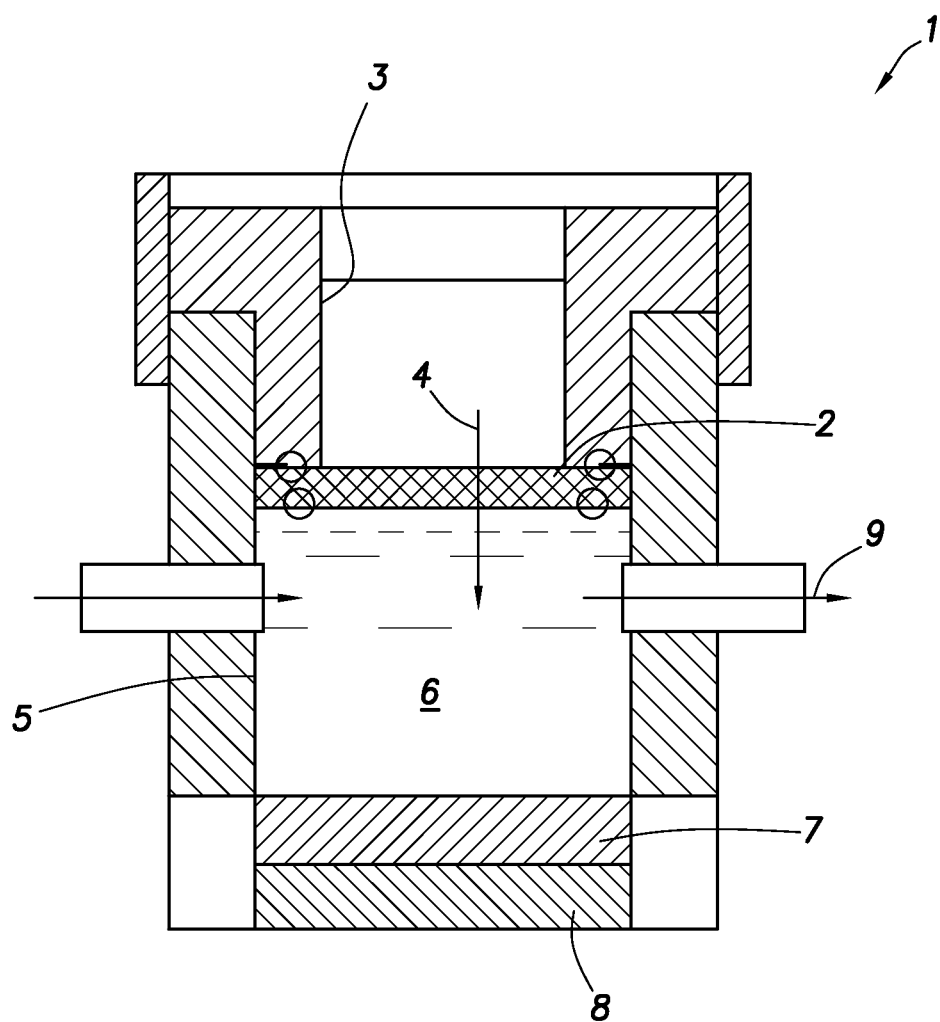
FIG. 1: A schematic showing the general operating principle of the apparatus of the invention.

FIG. 1: A schematic showing the general operating principle of the apparatus of the invention in which the following reference numerals refer:
1. Filtration unit
2. Porous filter
3. Upper (pre-filtration) chamber for receiving fluid sample
4. Fluid sample
5. Lower (post-filtration) chamber for receiving backflushing fluid
6. Fluid provided in the post-filtration chamber
7. Resonating substrate
8. Acoustic wave generating element
9. Vacuum draw (optional)

The porous filter 2 separates a filtration unit 1 into two chambers; an upper (pre-filtration) chamber 3 into which a fluid sample 4 requiring cell separation is introduced and a lower (post-filtration) chamber 5 into which a fluid 6 capable of transmitting an acoustic standing wave is introduced. An acoustic element 8 is coupled to a substrate 7 which is located within and at the bottom of the lower chamber and which resonates in response to the acoustic generating element and generates a standing wave through the two fluid phases and the filter to agitate the sample. Simultaneously, a cyclic process of vacuum draw 9 causes movement of the sample downwards through the filter. Vacuum pressure, fluid flow rate and frequency of vibration are controlled from a remote unit housing appropriate pumps and valves. A concentrated fraction of desired larger cells is retained on top of the filter while smaller cells pass through the filter to a waste receptacle (not shown).

In a specific embodiment of the invention the acoustic element is a speaker having a power of 0.4 W, resistance of 4 Ohm, amplitude in the range of between about 4.2V to 7.36V peak to peak and a frequency range in the range of between about 300-700 Hz.

Figure 2:
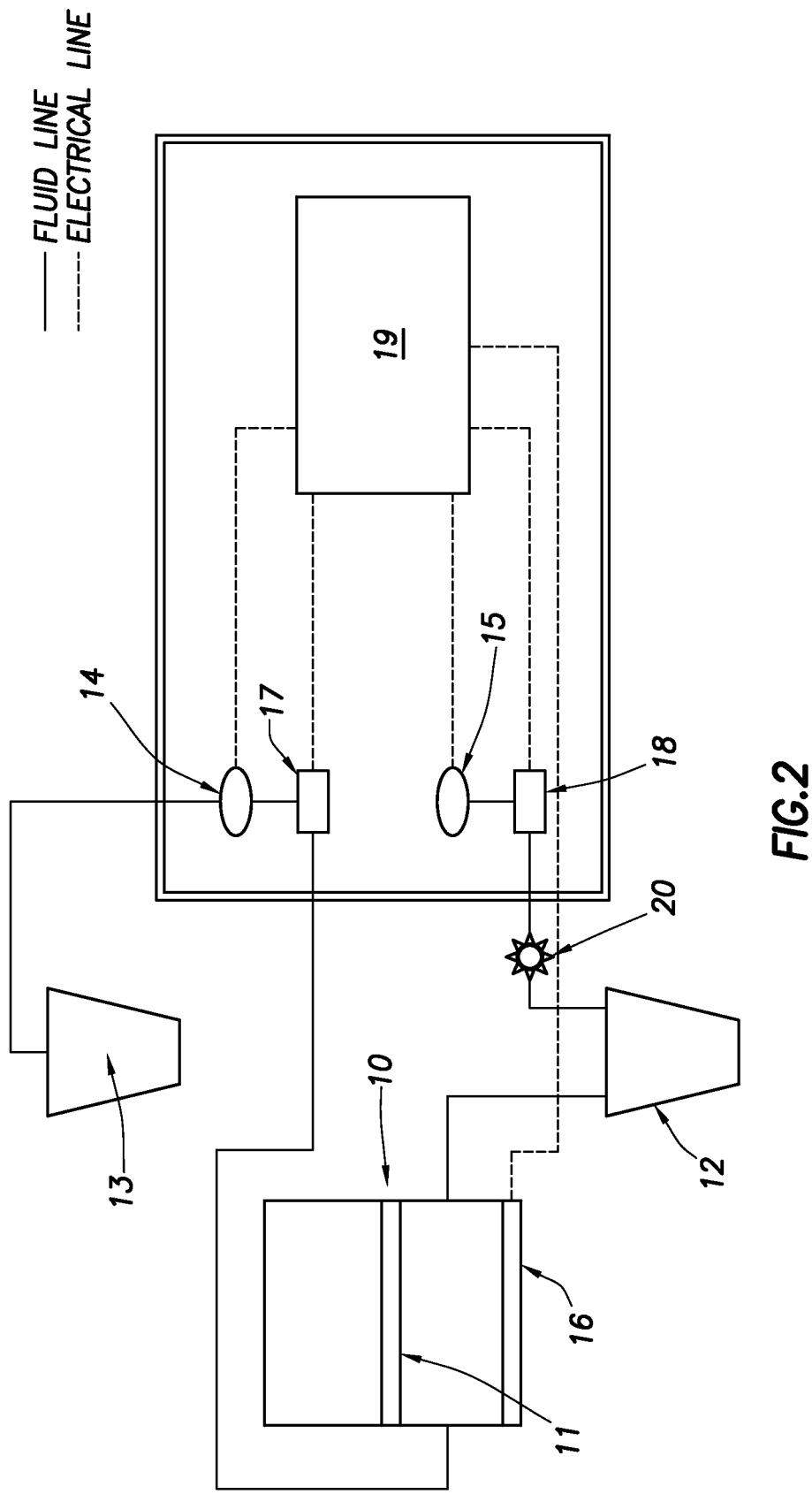
FIG. 2: A schematic representation of an embodiment of apparatus of the invention in which the fluids in the pre- and post-filtration chambers are sequentially moved across the filter.

FIG. 2: A schematic representation of an embodiment of apparatus of the invention in which the fluids in the pre- and post-filtration chambers are sequentially moved across the filter, and in which the following reference numerals refer
10. Filtration unit
11. Porous filter
12. Receptacle for receiving evacuated fluid from filtration unit
13. Receptacle for receiving backwashing fluid
14. Backwashing pump
15. Vacuum pump
16. Acoustic wave generating element/resonating substrate
17. Solenoid valve (back-flushing line)
18. Solenoid valve (vacuum line)
19. PLC digital control unit and display
20. Needle valve This figure illustrates an apparatus which comprises the filtration unit of the invention (as illustrated in FIG. 1) and a control unit. A PLC controller (Mitsubuishi AL2-24MR-04) in the control unit 19 can be programmed to switch the vacuum pump 15 and back-flushing pump 14 (both Koge KPV14A-6A) on and off. It is also used to control the triggering of solenoid valves (Cole Parmer 98302-02) 17 and 18. This can be programmed to run the valves and pumps in a timed sequence or to control the pumps manually. An amplifier and signal generator chip built into the control unit allows the frequency and amplitude of the acoustic element 18 to be set via the PLC. A receptacle to collect evacuated fluid from the device 12 and a receptacle to deliver back-flushing fluid 13 are connected to the filter unit and control unit with appropriate flow tubes.

Figure 3:
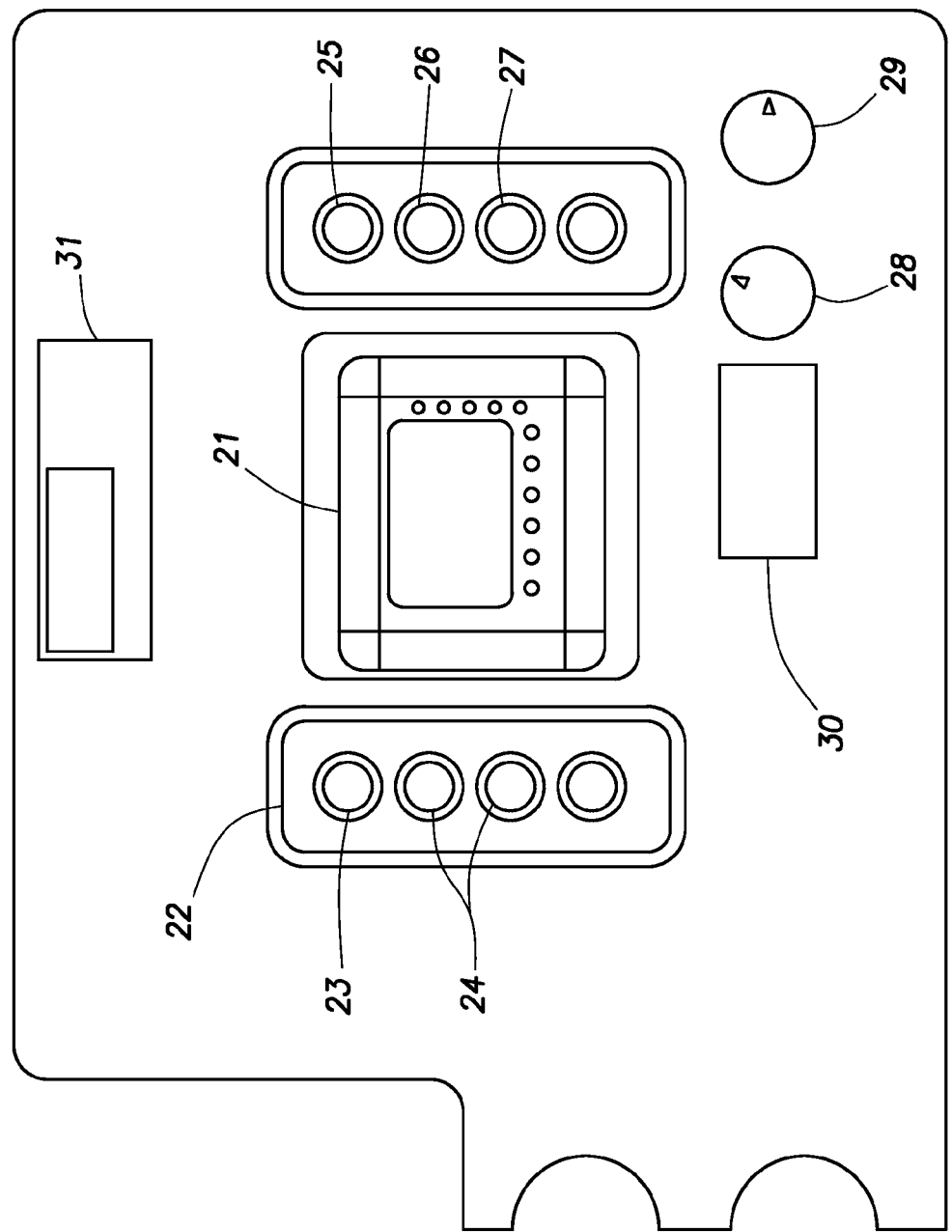
FIG. 3: A drawing showing the control unit.
Figure 4:
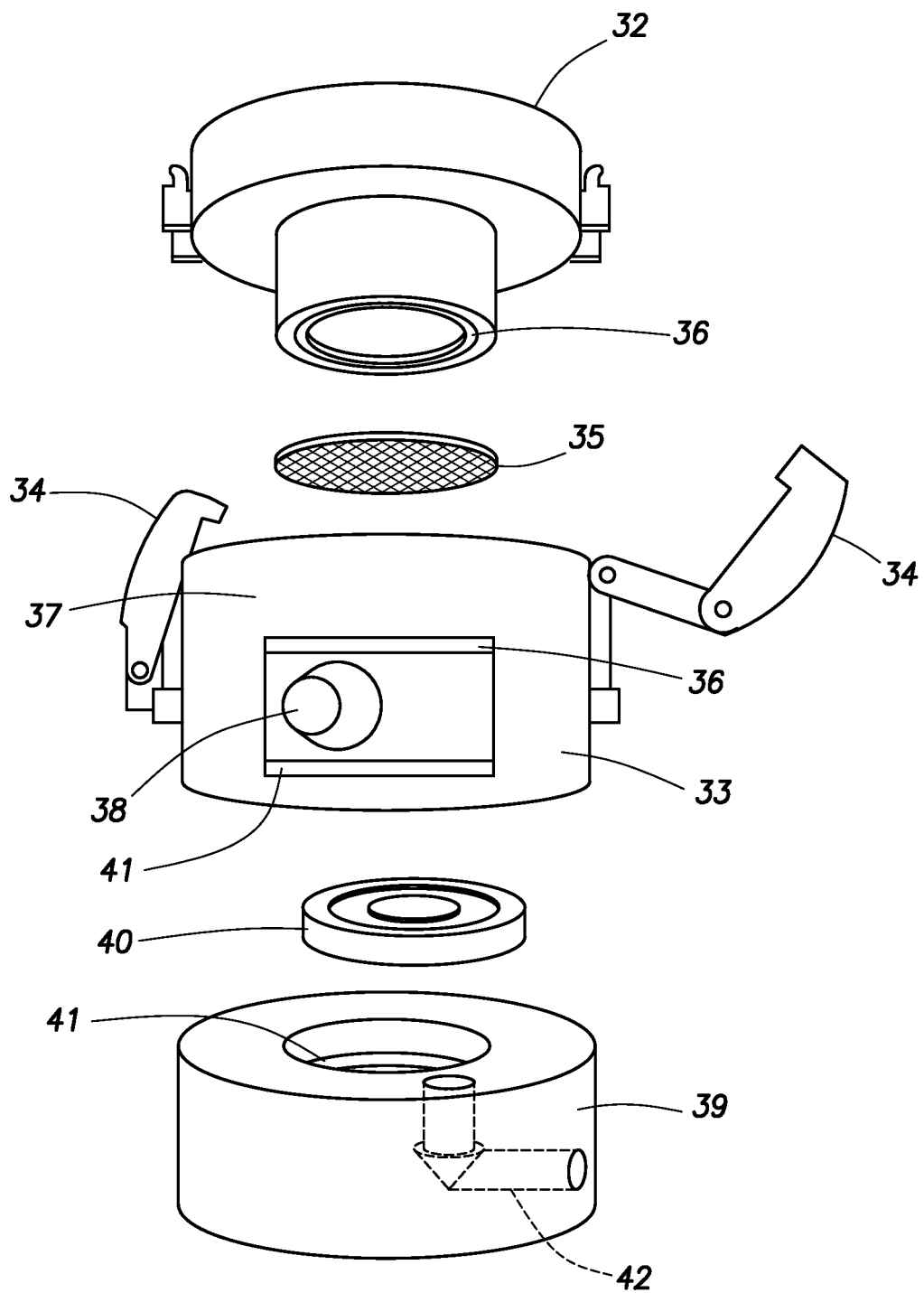
FIG. 4: A drawing showing the filtration unit.
Figure 5:
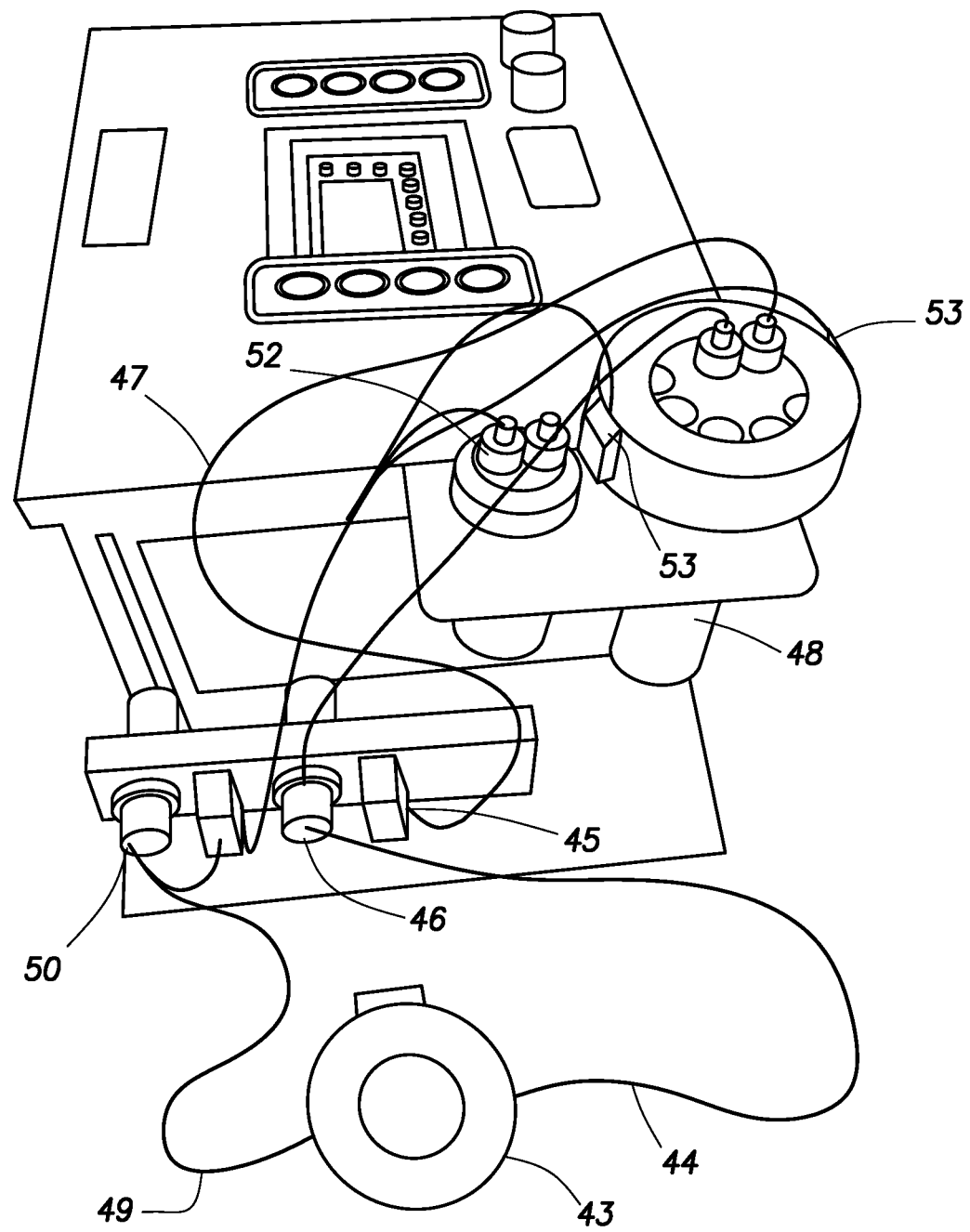
FIG. 5: A drawing showing the filtration unit connected to the control unit.
Figure 6:
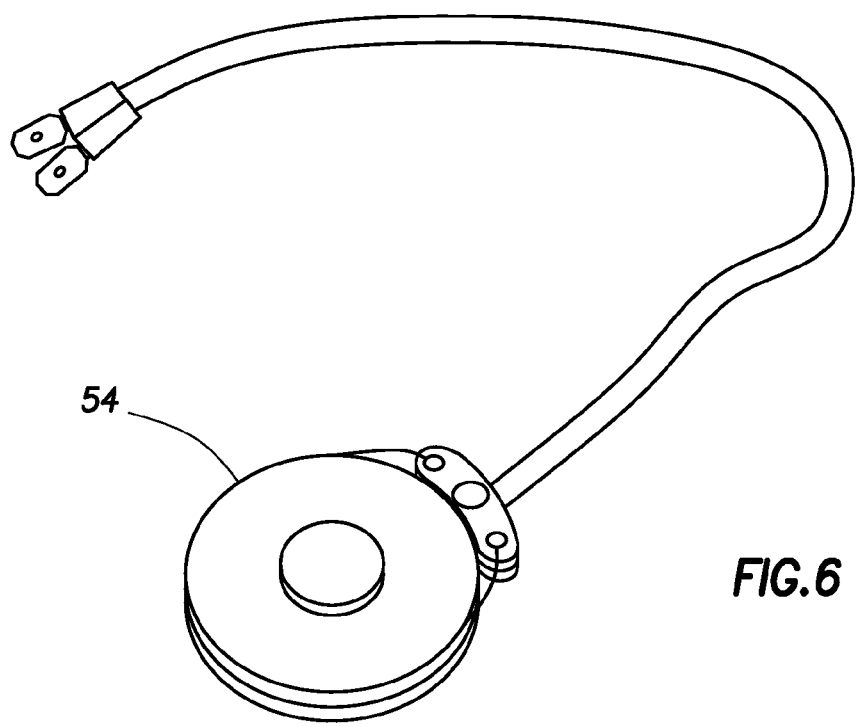
FIG. 6: A drawing showing the acoustic wave generating element

FIG. 3: A drawing showing the control unit in which the following reference numerals refer:
21. PLC unit housed in control box
22. control keypad
23. device on/off
24. vacuum line solenoid control
25. acoustic element on/off
26. vacuum manual override
27. backflush manual override
28. acoustic frequency control
29. acoustic element amplitude control
30. acoustic element frequency indicator
31. drip event indicator LED FIG. 4: A drawing showing illustrating the component assembly of filtration unit of the invention in which the following reference numerals refer:
32: upper chamber
33. middle chamber
34. clamps to secure upper chamber and middle chambers
35. membrane filter
36. O-rings sealing to filter when the upper and middle chambers are clamped together
37. upper tissue sample reservoir within middle chamber
38. input into saline reservoir below filter
39. lower chamber
40. acoustic element
41. O-rings sealing to acoustic element
42. exit for acoustic element electrical connection FIG. 5: A drawing showing the filtration unit connected to the control unit in which the following reference numerals refer:
43. filtration unit
44. vacuum line from filtration unit to vacuum pump
45. vacuum pump
46. vacuum solenoid
47. vacuum line to waste chamber
48. waste chamber
49. backflush line to filtration unit
50. backflush pump
51. backflush selonoid
52. backflush saline reservoir
53. drip event sensor FIG. 6: A drawing showing the acoustic wave generating element. A moving coil NXT excitor is shown 54.

The following description is related to embodiments of the invention in which the fluids are sequentially moved across the filter:

In normal operation the filter unit is free of fluid. The back-flushing pump is switched on to deliver fluid into the lower chamber of the filtration unit 10 until fluid passes through the filter 11 and into the upper (pre-filtration) chamber. The acoustic element has an amplitude in the range 4.2V through 7.36V peak to peak and a frequency range 300 to 700 Hz. The element is set to drive a standing wave through the fluid and the fluid is observed to be in constant agitation. The vacuum pump is switched on to draw the fluid level down just to the point of passage across the filter. The flow-rate across the filter is adjusted accordingly by a needle valve 20. The sample fluid is delivered to the upper (pre-filtration) chamber and is observed to be in constant agitation. The cyclic process of rapid back-flushing and vacuum draw to slowly reduce the sample volume is initiated from the PLC. The sample volume is reduced typically by 10-fold and the process is stopped from the PLC. The sample volume is removed from the upper (pre-filtration) chamber.

Figure 7:
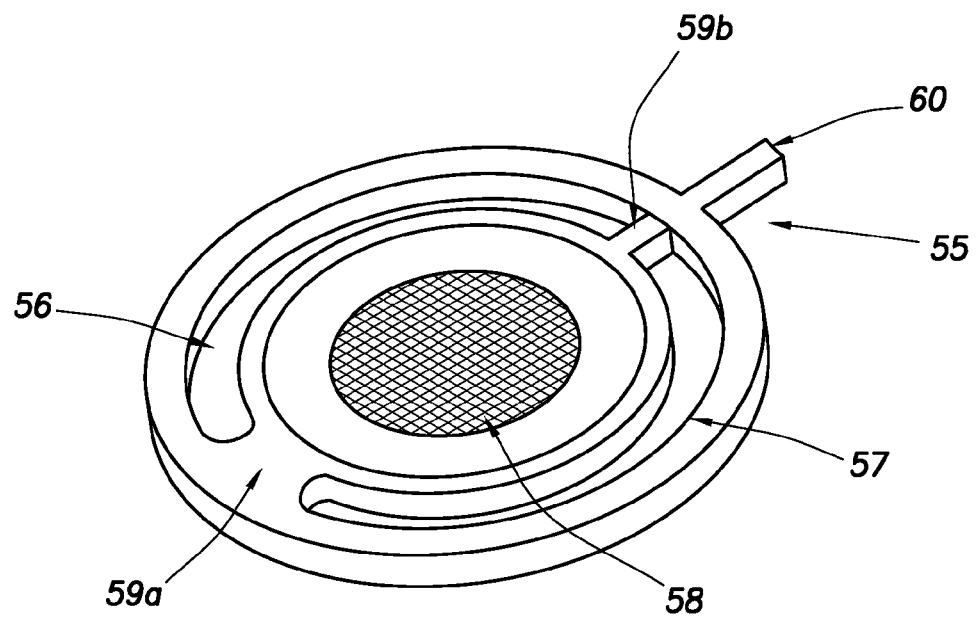
FIG. 7: Vibrating filter holder for use within the filtration unit.

FIG. 7 illustrates a filter holder for use in the apparatus of the present invention. The design of the filter holder permits movement of the filter in a lateral or vertical direction or a combination thereof. The holder 55 is substantially circular. A horseshoe-shaped or U-shaped aperture 56 splits the holder into two portions, an outer annular portion 57 and a central circular island 58. Portion 57 is connected to portion 58 by bridge elements 59a and 59b. Portion 58 is provided with a plurality of pores. The pores are distributed in a uniform pattern. The pores are substantially circular having a diameter of about 3 microns. A pin element 60 is provided on the outer surface of portion 57 in line with bridge element 59b. This pin element 60 is mechanically driven by a motor and cam (not shown) which are exterior to the apparatus.

The combined filter holder and filter are manufactured as a single plastic unit.

Examples of Separation of a Solid Fraction from a Fluid Sample

1. Human Bone Marrow Aspirate Samples

Human bone marrow aspirate was obtained commercially from Cambrex before use they were passed through a 70 μm cell strainer to remove any adipocytes and large cell aggregates. The white blood cells (WBC) and red blood cells (RBC) were counted using the coulter counter. 2 mls of cell suspension was added into the device which had been loaded with a photo-electroformed mesh, acting as the filter having a pore size about ~3 μm. The separation process was initiated using the control unit of the device and continued until a concentrated fluid fraction of approximately 200 μl remained upstream of the filter in the upper chamber of the device. Post-processing, 100 μl of the concentrate was removed from on top of the filter in the device and then passed through the coulter counter which was calibrated to daily standards before each experiment. The resulting WBC and RBC counts in the sample were obtained.

2. Porcine Bone Marrow Samples

Isolation and Culture-Expansion of Porcine Cell Populations

Fresh porcine hind limbs were collected from an abattoir. Trabeculum bone marrow was extracted from the femoral head of each leg and collected into pots containing PBS. The marrow was minced finely using scissors and the resulting slurry was left to agitate on an orbital shaker at 37° C./5% $CO_2$, after this the supernatant was passed through 70 µm cell strainer into separate tubes. The tubes were then spun at 1500 rpm for 5 minutes and the supernatant discarded, the resulting pellets were re-suspended in 10 ml of α-MEM+15% FCS media.

Bone marrow was isolated and processed as above, 100 µl of the bone marrow suspension was then passed through the coulter counter which was calibrated to daily standards before each experiment. The resulting WBC and RBC counts obtained were used to bring the WBC of the bone marrow extract to $1 \times 10^7$ cells per ml by diluting the extract with porcine plasma. 2 mls of this fluid was added to the device for separation.

Preparation of Porcine Plasma

Fresh porcine blood was collected from an abattoir in a storage bottle that contained sodium citrate tribasic solution 4% (w/v) (Sigma) at a ratio of 1:9 (sodium citrate to blood). The blood was aliquoted into 50 ml falcon tubes and spun at 2500 rpm for 30 minutes and the supernatant carefully transferred to another falcon tube. The supernatant was spun again at 2500 rpm for 30 minutes and the supernatant transferred to a new 50 ml falcon tube, and stored at −20° C. until ready for use.

Ficoll Separation of Porcine Bone Marrow Aspirate

Bone marrow was extracted from a fresh porcine hind limb as previously described, and the final cell pellet was re-suspended in 25 mls of α-MEM+15% FCS media.

Fresh porcine blood, was diluted with phosphate buffered saline, to bring the number of RBC down to roughly $3.5 \times 10^9$ cells per ml. Once this was done the number of WBC was increased to roughly $2.5 \times 10^7$ cells per ml; by adding the bone marrow obtained earlier. The blood was then diluted 2:1 (balanced salt solution: blood) and then 35 mls of this diluted blood was then layered on top of 15 mls of Ficoll (Amersham biosciences). The tubes were then spun at 1800 rpm for 30 minutes with the brake switched off. (Megafuge 1.0R SOP/CB/021.). The WBC layer was then extracted and pelleted down and resuspended in low glucose DMEM media and counts performed on both the RBC and WBC products.

3. Porcine Blood Samples

Fresh porcine blood was collected from an abattoir in a storage bottle that contained sodium citrate tribasic solution 4% (w/v) at a ratio of 1:9 (sodium citrate to blood). Typically, a 20 ml aliquot of this was passed through a 70 µm cell strainer into a collection tube. This process was repeated three times using a fresh strainer in each pass. 2 mls of the final strained sample was added to the device for separation.

Results

Figure 8:
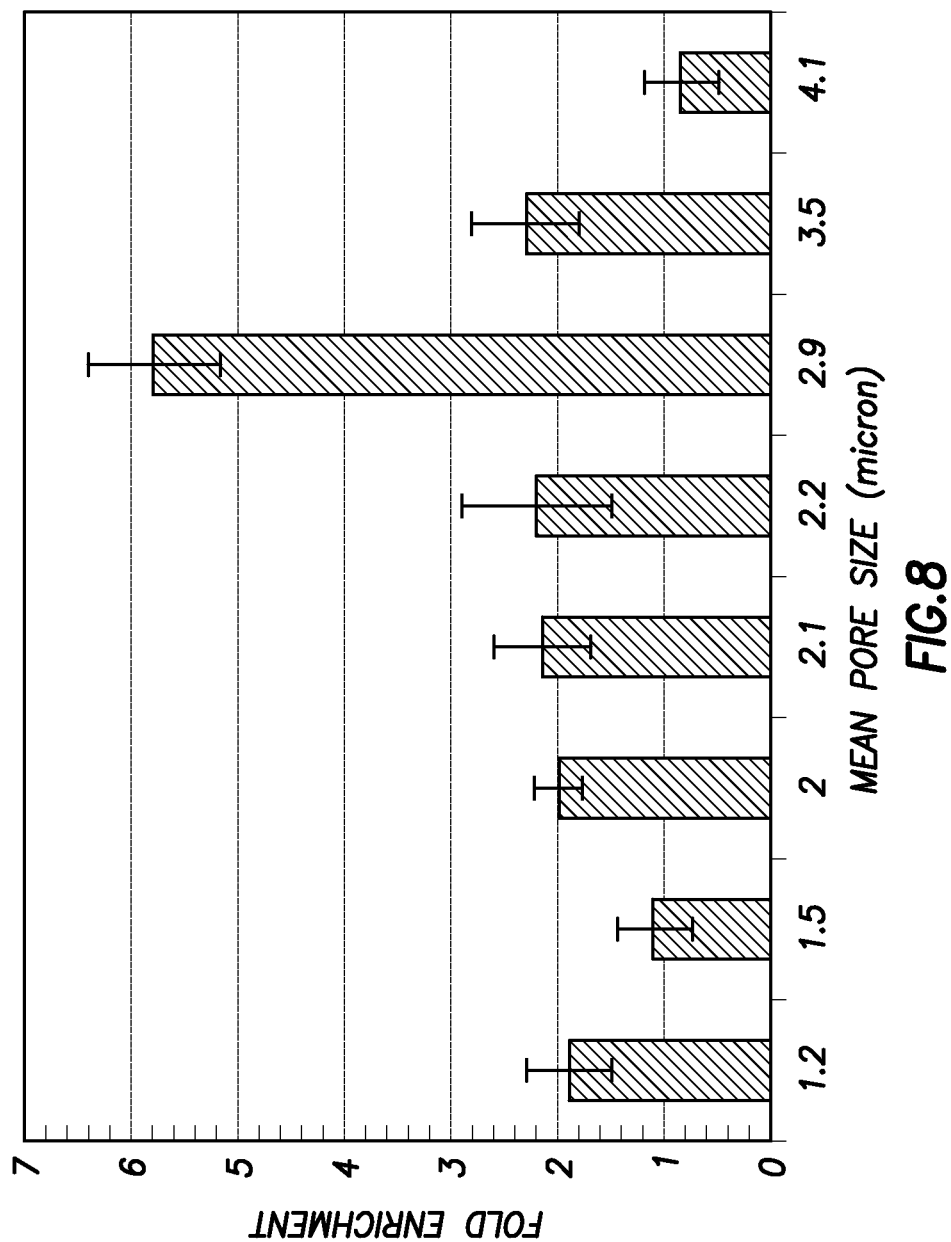
FIG. 8: Average enrichment of mononuclear cells (MNCs) from porcine whole blood using filters of a given mean pore size within the apparatus of the present invention (n=6).

FIG. 8: A filter having a pore size of about 3 microns is demonstrated as being optimal ($p < 0.05$) in recovering MNCs from whole porcine blood: Statistical test utilized is the one-way ANOVA with Tukey post-hoc analysis and a 95% confidence interval.

Figure 9:
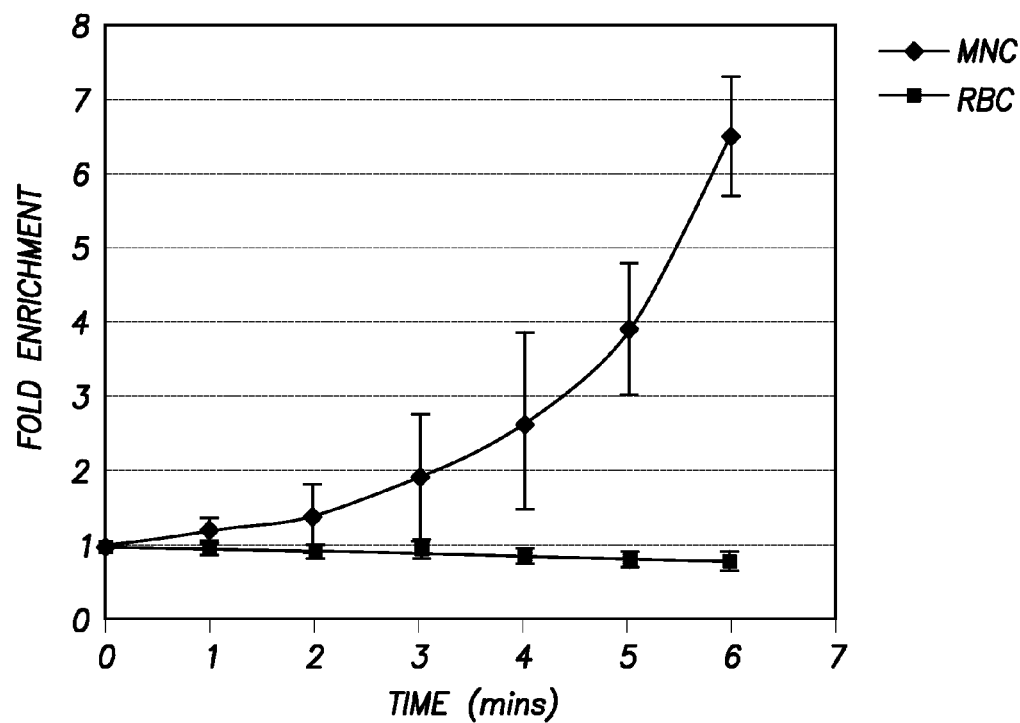
FIG. 9: Processing time for enrichment of MNCs from whole porcine blood using filters having a mean pore size of about 2.9 micron within apparatus of the present invention (n=3).

FIG. 9 illustrates that MNCs from whole porcine blood can be enriched over 6-fold within 6 minutes when a filter having a pore size of about 3 microns is used.

Figure 10:
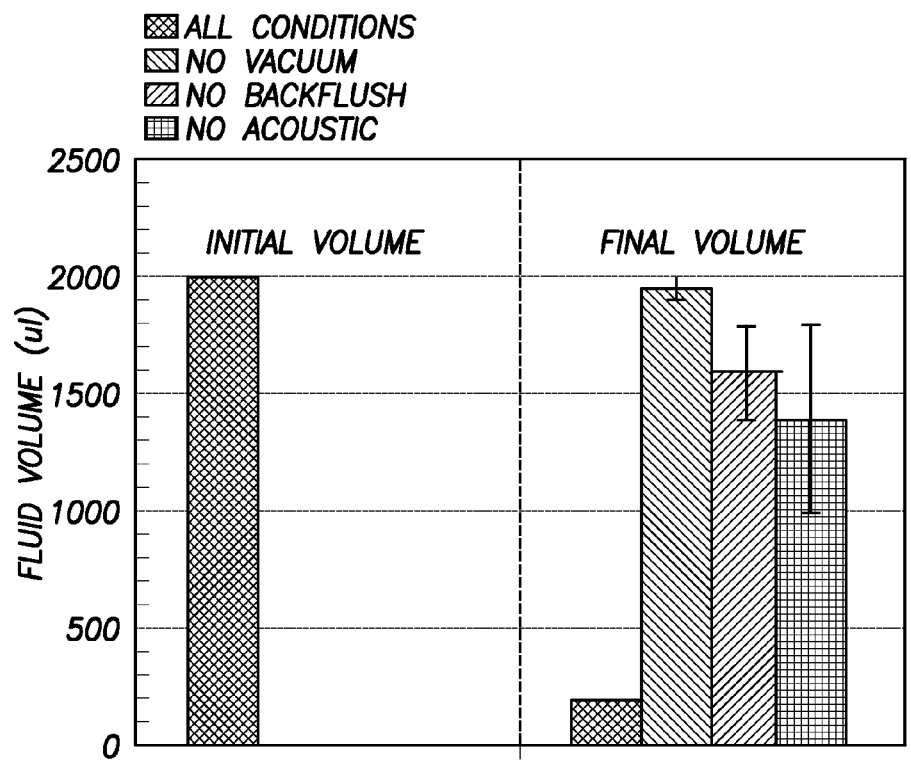
FIG. 10: Volume reduction of porcine bone marrow tissue over 8 minutes for varying operational conditions using apparatus of the present invention. The apparatus uses a filter having a mean pore size of about 3 micron and a flow rate of 6 drops/min.

FIG. 10 illustrates that that a volume reduction of porcine bone marrow tissue of about 10-fold is attainable when the operational conditions used in the apparatus combine: (i) a vacuum drawing the fluid sample downwards through the filter, (ii) a backwash forcing the washing fluid upwards through the filter, and (iii) an acoustic element that generates and transmits a standing wave upwards through the washing fluid and the sample fluid.

Figure 11:
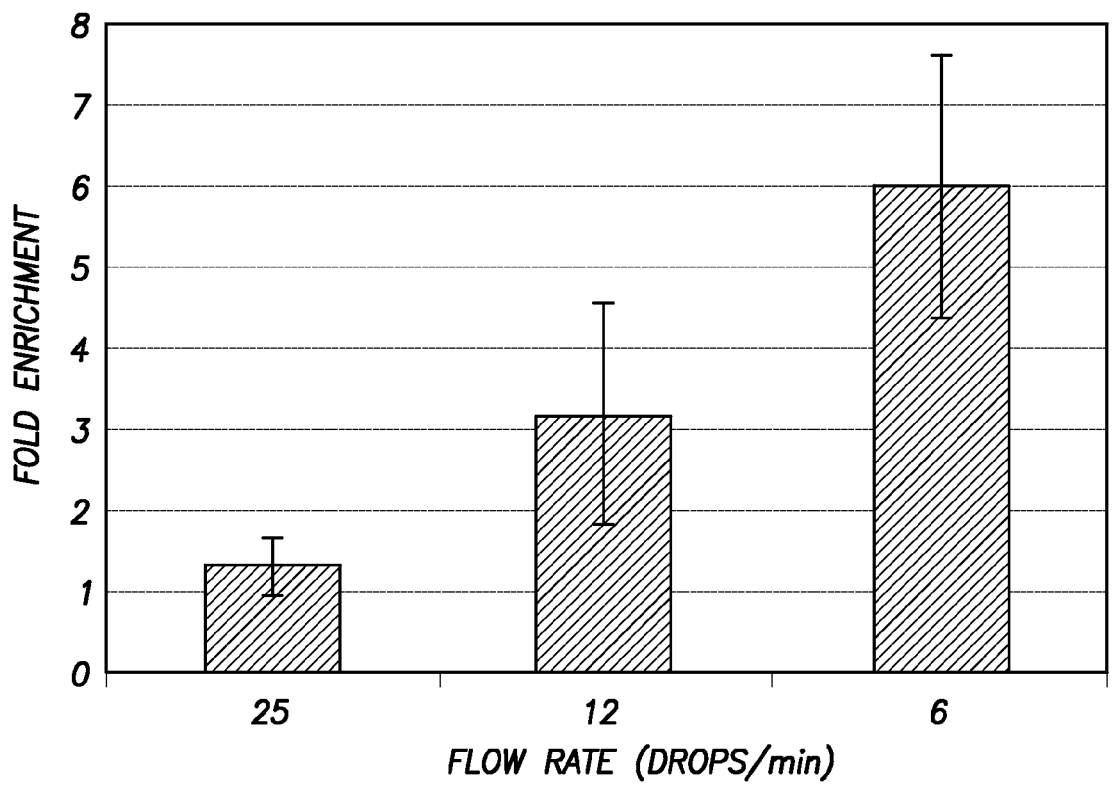
FIG. 11: Optimized flow-rate across the filter by restricting the vacuum pressure with an in-line needle valve.

FIG. 11 the optimal flow rate of fluid through the filter was determined. The fluid sample was derived from porcine marrow. The pre-filtration fluid sample volume was 2 ml. The post-filtration fluid sample volume was 200 µl. Time to achieve this reduction in fluid sample volume was 8 mins at 6 drops/min, 4 mins at 12 drops/min and 2 mins at 25 drops/min all using 3 micron mesh filter. The optimal flow-rate was found to be 6 drops/min as this corresponds to an improved enrichment of MNCs in the concentrated fluid sample when compared to a flow rate of 12 drops/min or 25 drops/min.

Figure 12:
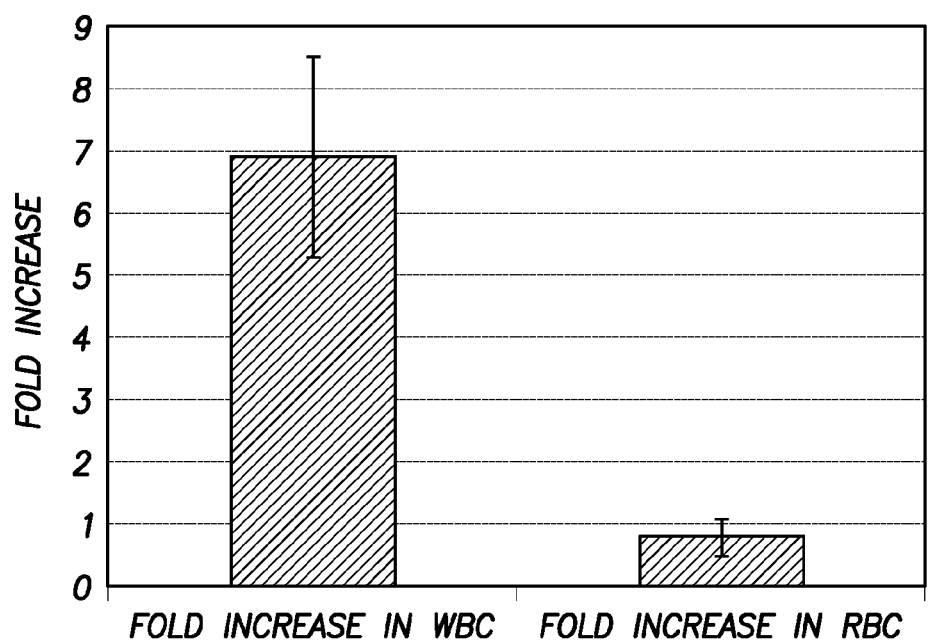
FIG. 12: The fold increase in white blood cells and red blood cells using apparatus of the present invention.

FIG. 12 illustrates the enrichment of WBCs compared to RBCs within the fluid sample post-filtration. A figure of less than 1 is indicative of RBCs passing through the filter.

Figure 13:
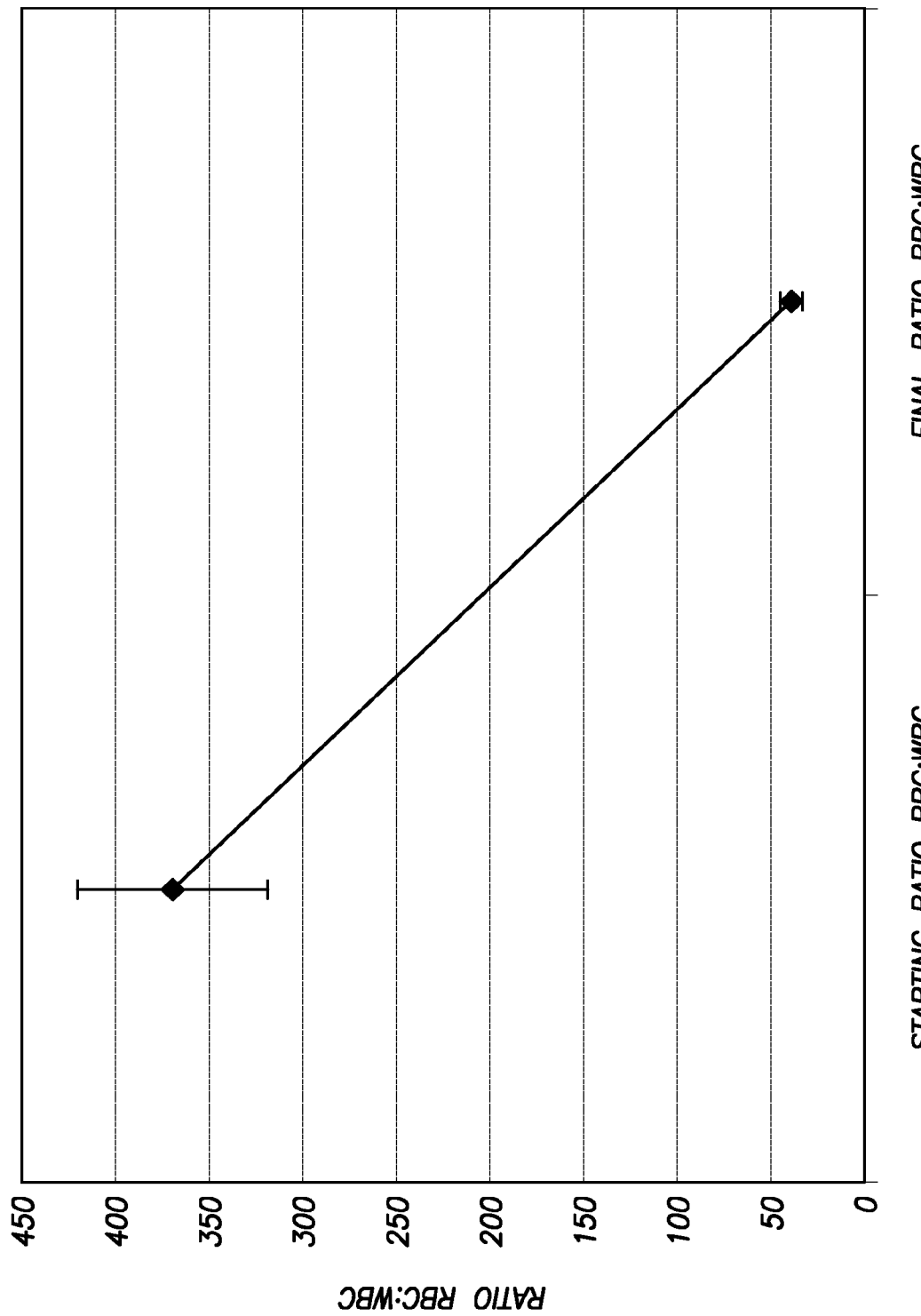
FIG. 13: The ratio of white blood cells to red blood cells within a whole porcine blood sample pre- and post-filtration using apparatus of the present invention.

FIG. 13 illustrates the ratio of RBC:WBC in a whole porcine blood sample pre- and post-filtration. Pre-filtration the ratio of RBC:WBC is about 375:1. Post-filtration the ratio of RBC:WBC is about 50:1.

Figure 14:
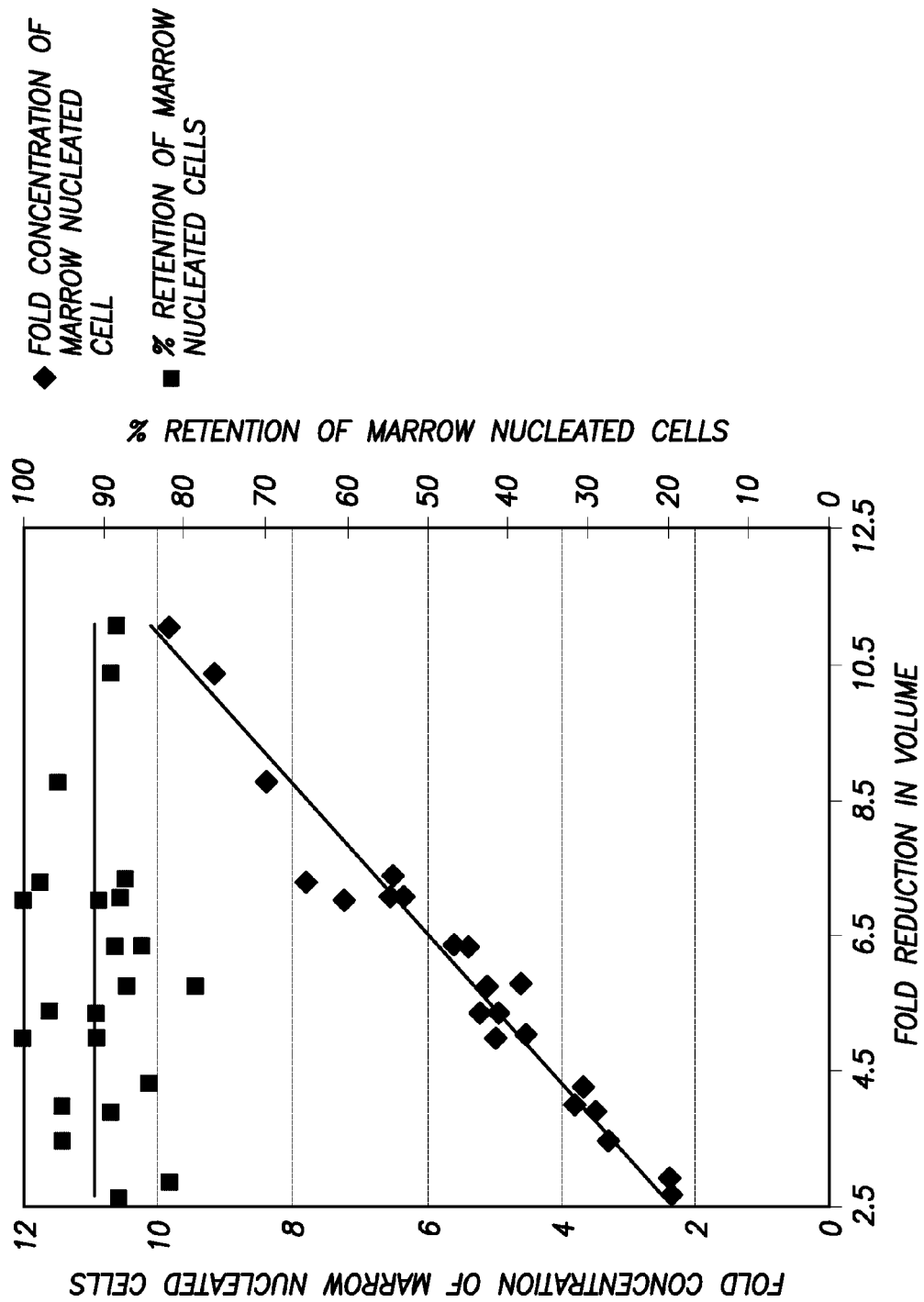
FIG. 14: Data using separation apparatus shows a volume reduction up to and beyond 10-fold can be achieved with >90% recovery of mononuclear cells. The volume reduction and concentration of mononuclear cells are linearly related. Typical processing time is less than 10 minutes.

FIG. 14 illustrates the fold concentration of marrow nucleated cells and the % retention of marrow nucleated cells from human bone marrow using a PET filter having a thickness of 23 µm, pore density of 400 k and a pore size of 3.5 µm.

Figure 15:
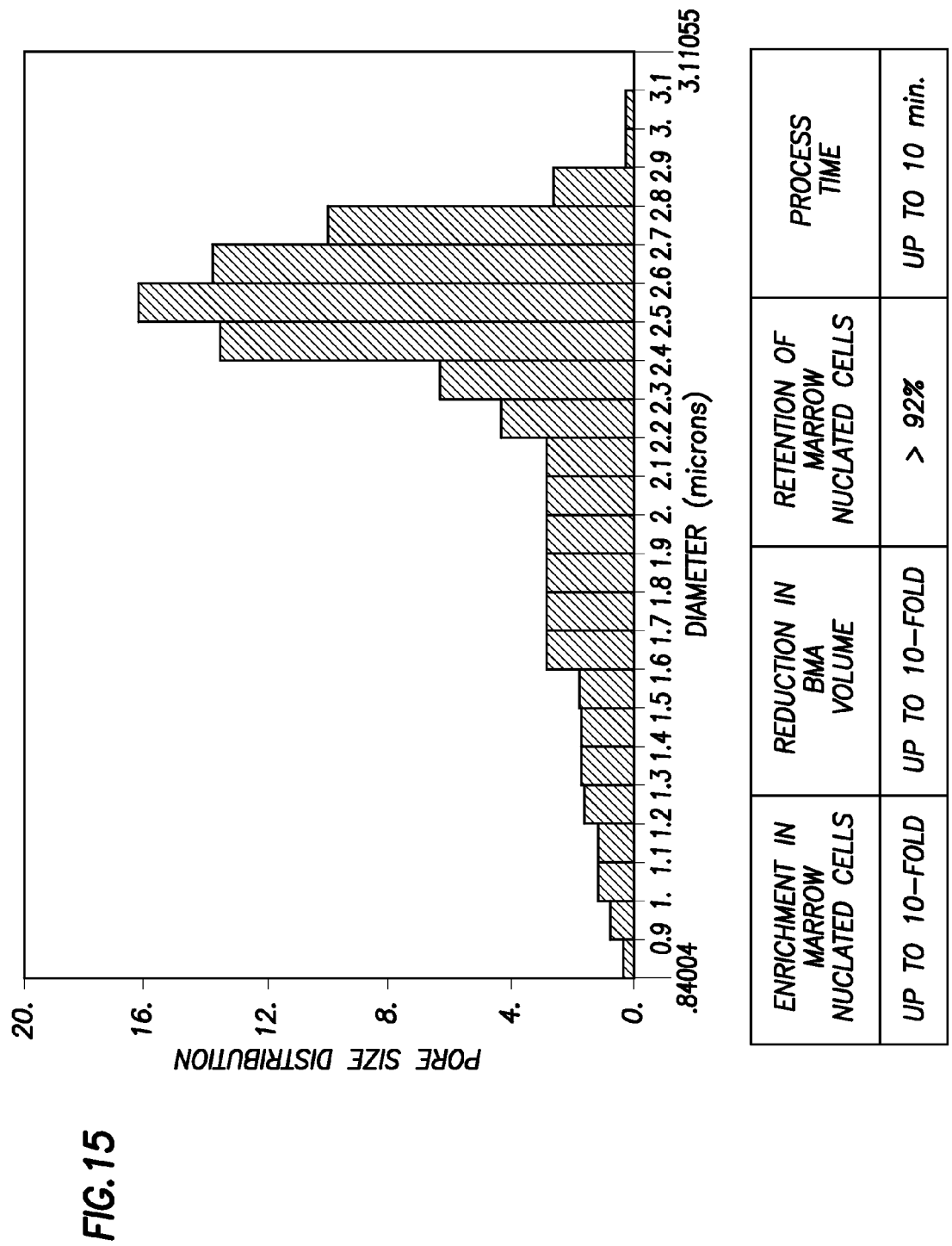
FIG. 15: Representative profile of the pore size distribution within a PET filter for separation of mononuclear cells from porcine BMA.

FIG. 15 illustrates the distribution of pore size on a PET filter having a pore density of 400,000. The figure further illustrates the performance of this filter when considering the processing cells from a bone marrow aspirate.

References

Caplan A I, review: Mesenchymal stem cells: Cell Based Reconstructive Therapy in orthopaedics. Tissue Eng. 11 (7/8) 1198-1211 (2005)

Takazawa Y, Tokashiki M. Production of human-mouse chimeric antibody by high cell density perfusion culture. Cytotechnology 2 95-101 (1989)

Apelman S. Separation of animal cells in continuous cell culture systems. In Animal cell technology: basic and applied aspects. Kluwer Academic Publishers 149-54 (1992)

Jaeger V. High density perfusion culture of animal cells using a novel continuous flow centrifuge: In Animal cell technology: basic and applied aspects 209-348 (1992)

Himmerlfarb P, Thayer P S, et al. Spin filter culture: the propagation of mammalian cells in suspension. Science 164 555-7 (1969)

Maiorella B, Dorin G et al. Crossflow micro filtration of animal cells. Biotechnol. Bioeng. 37 121-6 (1991)

Vogel J H, Kroner K H, Controlled shear filtration: a novel technique for animal cell separation. Biotechnol. Bioeng. 63(6) 663-74 (1999)

Radlett P J, The concentration of mammalian cells in a tangential flow filtration unit. J Appl. Chem Biotechnol. 22 495 (1972)

Castilho L R Medronho R A, Cell retention devices for suspended cell-perfusion cultures. Adv. Biochem Eng Biotechnol. 74 129-69 (2002)

Stromberg R R, Friedman L I et al. Membrane technology applied to donor plasmaphoresis. J Membrane Sci 44(1) 131-143 (1989)

Karumanchi R S M S, et al. Field assisted extraction of cells, particles and macromolecules. Trends Biotechnol. 20 (2) 72-78 (2002)

Docoslis A, et al. A novel dielectrophoresis-based device for the selective retention of viable cells in culture media. Biotechnol. Bioeng. 54(3) 239-50 (1997)

Docoslis A et al. Dielectrophoretic forces can be safely used to retain viable cells in perfusion cultures of animal cells. Cytotechnology 30 133-42 (1999)

Roath S, Richards Smith A, et al. High gradient magnetic separation in blood and bone marrow processing. J Magnetism and Magnetic Mater. 85 (1-3) 285-90 (1990)

Kilburn D G, Clarke D J et al. Enhanced sedimentation of mammalian cells following acoustic aggregation. Biotechnol. Bioeng. 34 559-62 (1989)

Coakley W T, Whitworth G et al. Ultrasonic manipulation of particles and cells. Bioseparation. 4 73-83 (1994)

Doblhoff-Dier O, Gaider T H et al. A novel ultrasonic resonance field device for the retention of animal cells. Biotechnol. Prog. 10 428-432 (1994)

Gaida T H, et al. Selective retention of viable cells in ultrasonic resonance field devices. Biotechnol. Prog. 12 73-6 (1996)

Gorenflo V M, Smith L et al. Scale-up and optimisation of an acoustic filter for 200 L/day perfusion of CHO cell culture. Biotechnol. Bioeng. 80 (4) 438-44 (2002)

Gorenflo G M, Angepat S et al. Optimization of an acoustic cell filter with a novel air backflush system. Biotechnol. Prog. 19 30-6 (2003)

The invention claimed is:

1. An apparatus for separating a specific cell fraction containing mononuclear cells from a fluid sample containing a heterogeneous mixture of cells having at least mononuclear cells and red blood cells, the apparatus comprising a filtration unit, the filtration unit comprising:
   at least one filter, which: (i) has pores capable of separating the heterogeneous mixture of cells in the fluid sample, comprising at least mononuclear cells and red blood cells, into the specific cell fraction, having the mononuclear cells; and (ii) divides the unit into a pre-filtration chamber for receiving the fluid sample, and a post-filtration chamber for receiving a fluid of the fluid sample and the at least red blood cells of the heterogeneous mixture of cells in the fluid sample;
   a programmable logic controller;
   an acoustic wave generating element capable of generating an acoustic wave in at least one of the group consisting of the fluid sample in the pre-filtration chamber, or the fluid of the fluid sample in the post-filtration chamber; and
   a substrate capable of attachment to the acoustic wave generating element.

2. The apparatus of claim 1, wherein the acoustic wave generated by the acoustic wave generating element agitates at least one of the group consisting of the fluid sample in the pre-filtration chamber, the at least one filter, or the fluid of the fluid sample in the post-filtration chamber.

3. The apparatus of claim 2, wherein there is a relationship between a frequency of the acoustic wave generated by the acoustic wave generating element and an amount of agitation of at least one of the fluid sample in the pre-filtration chamber, the at least one filter, or the fluid of the fluid sample in the post-filtration chamber.

4. The apparatus of claim 1, wherein the programmable logic controller is capable of controlling the frequency of an acoustic wave generated by the acoustic wave generating element.

5. The apparatus of claim 1, wherein the at least one filter is manufactured of a synthetic material.

6. The apparatus of claim 1, wherein the at least one filter comprises a plurality of pores and wherein a pore diameter is between about 1 and 12 microns.

7. The apparatus of claim 1, wherein the at least one filter is a tracked etched filter and/or a nickel filter.

8. The apparatus of claim 1, wherein the at least one filter has a thickness of about 11 to 50 microns.

9. The apparatus of claim 1, wherein the at least one filter comprises a pore density of about 400,000 pores/cm$^2$.

10. The apparatus of claim 1, wherein the at least one filter comprises a plurality of pores and wherein a pore geometry is selected from the group consisting of circular, ellipsoidal, square, rectangular, or triangular.

11. The apparatus of claim 1, further wherein the pre-filtration chamber of the filtration unit is divided into multiple chambers capable of receiving batch fluid samples presented as a well plate format.

12. An apparatus for separating a specific cell fraction from a fluid sample containing a heterogeneous mixture of cells, the apparatus comprising a filtration unit, the filtration unit comprising:
   i. the fluid sample containing the heterogeneous mixture of cells comprising at least mononuclear cells and red blood cells;
   ii. the specific cell fraction having mononuclear cells;
   iii. at least one filter having pores to separate the heterogeneous mixture of cells into the specific cell fraction, the at least one filter dividing the unit into a pre-filtration chamber for receiving the fluid sample and a post-filtration chamber for receiving fluid of the fluid sample and the at least red blood cells of the heterogeneous mixture of cells of the fluid sample;
   iv. an acoustic wave generating element capable of generating acoustic waves capable of causing agitation in at least one of the fluid sample, the at least one filter, or the fluid of the sample in the post-filtration chamber;
   v. a substrate capable of attachment to the acoustic wave generating element; and
   vi. a pressure system capable of backflushing the filter by positive pressure in the post-filtration chamber, or drawing the fluid of the fluid sample and the at least red blood cells of the heterologous mixture of cells of the fluid sample into the post-filtration chamber by negative pressure in the post-filtration chamber.

13. The apparatus of claim 12, further comprising a programmable logic controller capable of controlling the pressure system.

14. The apparatus of claim 12, wherein the positive pressure in the post-filtration chamber is in the range of about +0.1 to +0.5 psi.

15. The apparatus of claim 12, wherein the positive and/or negative pressure in the post-filtration chamber is in the range of about −0.5 to +0.5 psi.

16. The apparatus of claim 12, wherein the positive pressure and the negative pressure in the post-filtration chamber alternate in a cyclic manner with a net negative pressure in the post-filtration chamber and a net reduction in volume of the fluid sample in the pre-filtration chamber following a cycle.

17. The apparatus of claim 12, further comprising a vacuum pump.

18. The apparatus of claim 12, further comprising a backflushing fluid for backflushing the at least one filter.

19. An apparatus for separating a specific cell fraction containing mononuclear cells from a fluid sample containing a heterogeneous mixture of cells having at least mononuclear cells and red blood cells, the apparatus comprising a filtration unit, the filtration unit comprising:
   at least one filter, which: (i) has pores capable of separating the heterogeneous mixture of cells in the fluid sample, comprising at least mononuclear cells and red blood cells, into the specific cell fraction, having the mononuclear cells; and (ii) divides the unit into a pre-filtration chamber for receiving the fluid sample, and a post-filtration chamber for receiving a fluid of the fluid sample and the at least red blood cells of the heterogeneous mixture of cells in the fluid sample;
   a programmable logic controller;
   an acoustic wave generating element capable of generating an acoustic wave in at least one of the group consisting of the fluid sample in the pre-filtration chamber, or the fluid of the fluid sample in the post-filtration chamber;
   a substrate capable of attachment to the acoustic wave generating element; and an agitation element capable of agitating at least one of the group consisting of the fluid sample in the pre-filtration chamber, the at least one filter, or the fluid of the fluid sample in the post-filtration chamber.

20. The apparatus of 19, wherein the agitation element is selected from the group consisting of an impeller or other insert capable of movement to agitate the fluid sample within the pre-filtration chamber, a wall defining the pre-filtration chamber capable of rotating to agitate the fluid sample within the pre-filtration chamber, a wall defining the pre-filtration chamber and comprising baffles and capable of rotating to agitate the fluid sample within the pre-filtration chamber, or an at least one filter holder capable of vibrating the at least one filter in a vertical direction, a lateral direction, or a combination thereof.

21. The apparatus of 19, wherein the substrate comprises at least one material selected from the group consisting of metals, ceramics, and polymers.

\* \* \* \* \*